United States Patent
Hara et al.

(10) Patent No.: US 12,273,487 B2
(45) Date of Patent: Apr. 8, 2025

(54) IMAGE FORMING SYSTEM DETECTING CHANGE IN PHYSICAL QUANTITY (SOUND) FROM VARIABLE MECHANISM AND DETERMINING AND NOTIFYING AN ABNORMAL CONDITION BASED ON THE CHANGE COMPARED TO A THRESHOLD

(71) Applicant: CANON KABUSHIKI KAISHA, Tokyo (JP)

(72) Inventors: Seiji Hara, Shizuoka (JP); Yohei Suzuki, Shizuoka (JP); Masatoshi Yoshida, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/523,065

(22) Filed: Nov. 29, 2023

(65) Prior Publication Data
US 2024/0179248 A1 May 30, 2024

(30) Foreign Application Priority Data
Nov. 29, 2022 (JP) ................................. 2022-189868

(51) Int. Cl.
*H04N 1/00* (2006.01)
(52) U.S. Cl.
CPC ..... *H04N 1/00037* (2013.01); *H04N 1/00015* (2013.01); *H04N 1/00074* (2013.01)
(58) Field of Classification Search
CPC ........... H04N 1/00015; H04N 1/00037; H04N 1/00074; G06K 15/408; G06F 3/121; G06F 3/1234
See application file for complete search history.

(56) References Cited

U.S. PATENT DOCUMENTS 6,564,019 B2 * 5/2003 Ahn .................... G03G 15/234
                                                                 399/13
7,539,599 B2 * 5/2009 Hasegawa .......... H04N 1/00029
                                                                 702/110
(Continued)

FOREIGN PATENT DOCUMENTS

JP           2008032948 A  *  2/2008
JP           2008040070 A     2/2008
(Continued)

OTHER PUBLICATIONS

Extended European search report and opinion for Application No. EP 23 21 2387 dated Jul. 17, 2024.*

*Primary Examiner* — Scott A Rogers
(74) *Attorney, Agent, or Firm* — Canon U.S.A., Inc. IP Division

(57) ABSTRACT

An image forming system includes an image forming apparatus and a management apparatus. The image forming apparatus includes a variable mechanism, a physical quantity detection unit that detects a change in physical quantity caused when a state of the variable mechanism changes, an abnormality detection unit that detects an abnormal condition, and a transmission unit that transmits detection results of the physical quantity detection unit and the abnormality detection unit to the management apparatus. The management apparatus includes a determination unit that determines a cause of the abnormal condition, and a notification unit that provides a notification that the abnormal condition is caused by a change in the state in accordance with a determination result. The determination unit determines that the abnormal condition is caused by a change in the state when the abnormal condition is detected after the change in physical quantity exceeds a threshold.

14 Claims, 17 Drawing Sheets

(56) References Cited

U.S. PATENT DOCUMENTS

| | | | | |
|---|---|---|---|---|
| 7,778,555 | B2* | 8/2010 | Shoji | H04N 1/00074 |
| | | | | 399/9 |
| 9,156,284 | B2* | 10/2015 | Nihashi | B41J 15/042 |
| 9,218,152 | B2* | 12/2015 | Hamano | G06F 11/0733 |
| 9,712,686 | B1* | 7/2017 | Zakharov | H04N 1/00119 |
| 11,514,283 | B2* | 11/2022 | Suzuki | G03G 15/55 |
| 11,827,486 | B2* | 11/2023 | Ogino | B65H 29/60 |
| 11,842,095 | B2* | 12/2023 | Suzuki | G06F 3/121 |
| 2016/0112602 | A1* | 4/2016 | Kawai | H04N 1/00029 |
| | | | | 358/1.14 |
| 2019/0187601 | A1* | 6/2019 | Seki | H04R 1/08 |
| 2021/0241058 | A1 | 8/2021 | Suzuki | |
| 2023/0288861 | A1* | 9/2023 | Mori | G03G 15/5029 |
| 2023/0393515 | A1* | 12/2023 | Hara | G03G 15/5008 |
| 2024/0272573 | A1* | 8/2024 | Hagiwara | G03G 15/55 |

FOREIGN PATENT DOCUMENTS

| | | | | |
|---|---|---|---|---|
| JP | 2012177748 | A | * | 9/2012 |
| JP | 2016022619 | A | * | 2/2016 |
| JP | 2018140867 | A | | 9/2018 |
| JP | 2021081471 | A | * | 5/2021 |
| JP | 2021120701 | A | | 8/2021 |
| JP | 2022022845 | A | * | 2/2022 |

* cited by examiner

FIG. 12

✓: SATISFIED   —: NOT SATISFIED

| | PRESENCE OF STRONG CASSETTE OPERATION | JAM OCCURRING UP TO PREDETERMINED NUMBER OF PRINTED SHEETS | JAM OCCURRING IN PREDETERMINED INTERVAL | AMOUNT OF LOADED PAPER | CAUSE OF JAM |
|---|---|---|---|---|---|
| CASE 1 | NO | N/A | N/A | N/A | OTHER THAN STRONG OPERATION |
| CASE 2 | YES | ✓ | — | N/A | OTHER THAN STRONG OPERATION |
| CASE 3 | YES | — | ✓ | N/A | OTHER THAN STRONG OPERATION |
| CASE 4 | YES | N/A | N/A | MEDIUM | OTHER THAN STRONG OPERATION |
| CASE 5 | YES | ✓ | ✓ | FULL | POSSIBLY DUE TO STRONG OPERATION |
| CASE 6 | YES | ✓ | ✓ | SMALL | POSSIBLY DUE TO STRONG OPERATION |

IMAGE FORMING SYSTEM DETECTING CHANGE IN PHYSICAL QUANTITY (SOUND) FROM VARIABLE MECHANISM AND DETERMINING AND NOTIFYING AN ABNORMAL CONDITION BASED ON THE CHANGE COMPARED TO A THRESHOLD

BACKGROUND

Technical Field

The present disclosure relates to an image forming system, an image forming apparatus, and a server.

Description of the Related Art

The recent market of image forming apparatuses (e.g., laser printers) provides increasing opportunities for companies to have a maintenance contract or a pay-per-use contract with users. The pay-per-use contract is, for example, a contract that charges users based on the number of sheets printed. As a result of repeating an image forming operation multiple times, some elements of the apparatuses that are involved in the image forming operation (e.g., the motor and/or blade) can reach the end of their usable life. In this case, if the expired members are not replaced this may lead to failure of the image forming apparatus, and/or a reduction in the quality of images formed by the apparatus etc. Under a maintenance contract (as described above) such members of the apparatus are replaced by a service engineer as appropriate.

The risks of abnormalities such as failure of the image forming apparatus and reduced image quality is affected not only by repeated image forming operations but also by how the user performs a physical operation such as opening and closing a cover, inserting and removing a tray, or attaching and removing a unit. In particular, operating the apparatus with too large a force for the apparatus to withstand can result in abnormalities such as damage or wearing of members and/or reduced image quality.

Japanese Patent Laid-Open No. 2021-120701 describes an image forming apparatus including a microphone that detects a sound produced by a user's operation. When the detected sound is loud and it is determined that the force applied to a variable mechanism such as a cover or a tray is too strong, a warning is issued to the user.

If too strong a force is applied to the variable mechanism such as the cover or the tray, an abnormal condition may occur during the subsequent image forming operation. For example, if too strong a force is applied to a paper feed tray to insert the paper feed tray into the apparatus main body, the position of the recording media loaded in the paper feed tray largely deviates from the normal position. This may cause a jam (i.e., a paper jam) during image formation.

In Japanese Patent Laid-Open No. 2021-120701, the risk of abnormalities such as failure of the image forming apparatus and poor quality of images due to the user's operation can be reduced by issuing a warning to the user. However, the cause of an abnormality that has occurred is not automatically identified later.

SUMMARY

The present disclosure provides identification of the cause of an abnormal condition of an image forming apparatus based on a sound produced by a user's operation.

According to an aspect of the present disclosure, an image forming system includes an image forming apparatus configured to form an image on a recording medium, and a management apparatus configured to manage the image forming apparatus. The image forming apparatus includes a variable mechanism configured to change from a first state to a second state or from the second state to the first state in response to being physically operated by a user, a physical quantity detection unit configured to detect a change in physical quantity caused when a state of the variable mechanism changes, an abnormality detection unit configured to detect an occurrence of an abnormal condition of the image forming apparatus, and a transmission unit configured to transmit a detection result of the physical quantity detection unit and a detection result of the abnormality detection unit to the management apparatus. The management apparatus includes a determination unit configured to determine whether the abnormal condition is caused by a change in the state of the variable mechanism, based on the detection results transmitted from the transmission unit, and a notification unit configured to provide a notification that the abnormal condition is caused by a change in the state of the variable mechanism in accordance with a determination result of the determination unit. The determination unit is configured to determine that the abnormal condition is caused by a change in the state of the variable mechanism when the abnormal condition is detected by the abnormality detection unit after the change in physical quantity detected by the physical quantity detection unit exceeds a threshold.

According to an aspect of the present disclosure, an image forming system includes an image forming apparatus configured to form an image on a recording medium, and a management apparatus configured to manage the image forming apparatus. The image forming apparatus includes a variable mechanism configured to change from a first state to a second state or from the second state to the first state in response to being physically operated by a user, a first state detection unit configured to detect a change in a state of the variable mechanism, a second state detection unit configured to detect a change in the state of the variable mechanism at a position different from a position of the first state detection unit, an abnormality detection unit configured to detect an occurrence of an abnormal condition of the image forming apparatus, and a transmission unit configured to transmit a detection result of the first state detection unit, a detection result of the second state detection unit, and a detection result of the abnormality detection unit to the management apparatus. The management apparatus includes a determination unit configured to determine whether the abnormal condition is caused by a change in the state of the variable mechanism, based on the detection results transmitted from the transmission unit, and a notification unit configured to provide a notification that the abnormal condition is caused by a change in the state of the variable mechanism in accordance with a determination result of the determination unit. The determination unit is configured to determine that the abnormal condition is caused by a change in the state of the variable mechanism when a time interval from detection of the change in the state by the first state detection unit to detection of the change in the state by the second state detection unit is shorter than a threshold time and thereafter the abnormal condition is detected by the abnormality detection unit.

According to an aspect of the present disclosure, an image forming apparatus for forming an image on a recording medium includes a variable mechanism configured to change from a first state to a second state or from the second state to the first state in response to being physically operated by a user, a physical quantity detection unit configured to detect a change in physical quantity caused when a state of the variable mechanism changes, an abnormality detection unit configured to detect an occurrence of an abnormal condition of the image forming apparatus, a determination unit configured to determine whether the abnormal condition is caused by a change in the state of the variable mechanism, based on a detection result of the physical quantity detection unit and a detection result of the abnormality detection unit, and a notification unit configured to provide a notification that the abnormal condition is caused by a change in the state of the variable mechanism in accordance with a determination result of the determination unit. The determination unit is configured to determine that the abnormal condition is caused by a change in the state of the variable mechanism when the abnormal condition is detected by the abnormality detection unit after the change in physical quantity detected by the physical quantity detection unit exceeds a threshold.

According to an aspect of the present disclosure, an image forming apparatus for forming an image on a recording medium includes a variable mechanism configured to change from a first state to a second state or from the second state to the first state in response to being physically operated by a user, a first state detection unit configured to detect a change in a state of the variable mechanism, a second state detection unit configured to detect a change in the state of the variable mechanism at a position different from a position of the first state detection unit, an abnormality detection unit configured to detect an occurrence of an abnormal condition of the image forming apparatus, a determination unit configured to determine whether the abnormal condition is caused by a change in the state of the variable mechanism, based on a detection result of the first state detection unit, a detection result of the second state detection unit, and a detection result of the abnormality detection unit, and a notification unit configured to provide a notification that the abnormal condition is caused by a change in the state of the variable mechanism in accordance with a determination result of the determination unit. The determination unit is configured to determine that the abnormal condition is caused by a change in the state of the variable mechanism when a time interval from detection of the change in the state by the first state detection unit to detection of the change in the state by the second state detection unit is shorter than a threshold time and thereafter the abnormal condition is detected by the abnormality detection unit.

According to an aspect of the present disclosure, an image forming system includes a server and an image forming apparatus configured to form an image on a recording medium. The image forming apparatus includes a main body, a unit configurable in a first state in which the unit is pulled out from the main body and a second state in which the unit is attached to the main body, a physical quantity detection unit configured to detect a physical quantity changing while the unit changes from the first state to the second state, an abnormality detection unit configured to detect an occurrence of an abnormal condition of the image forming apparatus, and a transmission unit configured to obtain (i) data from the physical quantity detection unit and (ii) a detection result of the abnormality detection unit and transmit the data and the detection result to the server. The server is configured to communicate with the image forming apparatus. The server includes a determination unit configured to determine whether the abnormal condition is detected by the abnormality detection unit after the data exceeds a threshold, based on the data and the detection result, and a notification unit configured to notify a display device so that the display device displays an information related to the abnormal condition and an abnormal operation of the unit when the determination unit determines that the abnormal condition is detected by the abnormality detection unit after the data exceeds the threshold. The data is related to the physical quantity detected when the unit changes from the first state to the second state.

According to an aspect of the present disclosure, a server communicates with an image forming apparatus configured to form an image on a recording medium. The image forming apparatus includes a main body, a unit configurable in a first state in which the unit is pulled out from the main body and a second state in which the unit is attached to the main body, a physical quantity detection unit configured to detect a physical quantity changing while the unit changes from the first state to the second state, an abnormality detection unit configured to detect an occurrence of an abnormal condition of the image forming apparatus, and a transmission unit configured to obtain (i) data from the physical quantity detection unit and (ii) a detection result of the abnormality detection unit and transmit the data and the detection result to the server. The server includes a determination unit configured to determine whether the abnormal condition is detected by the abnormality detection unit after the data exceeds a threshold, based on the data and the detection result, and a notification unit configured to notify a display device so that the display device displays an information related to the abnormal condition and an abnormal operation of the unit when the determination unit determines that the abnormal condition is detected by the abnormality detection unit after the data exceeds the threshold. The data is related to the physical quantity detected when the unit changes from the first state to the second state.

Further features of the present disclosure will become apparent from the following description of embodiments with reference to the attached drawings.

BRIEF DESCRIPTION OF THE DRAWINGS

FIG. 12 is a table illustrating example conditions to identify the cause of a malfunction due to strong operation of the cassette.

DESCRIPTION OF THE EMBODIMENTS

First Embodiment

Figure 1:
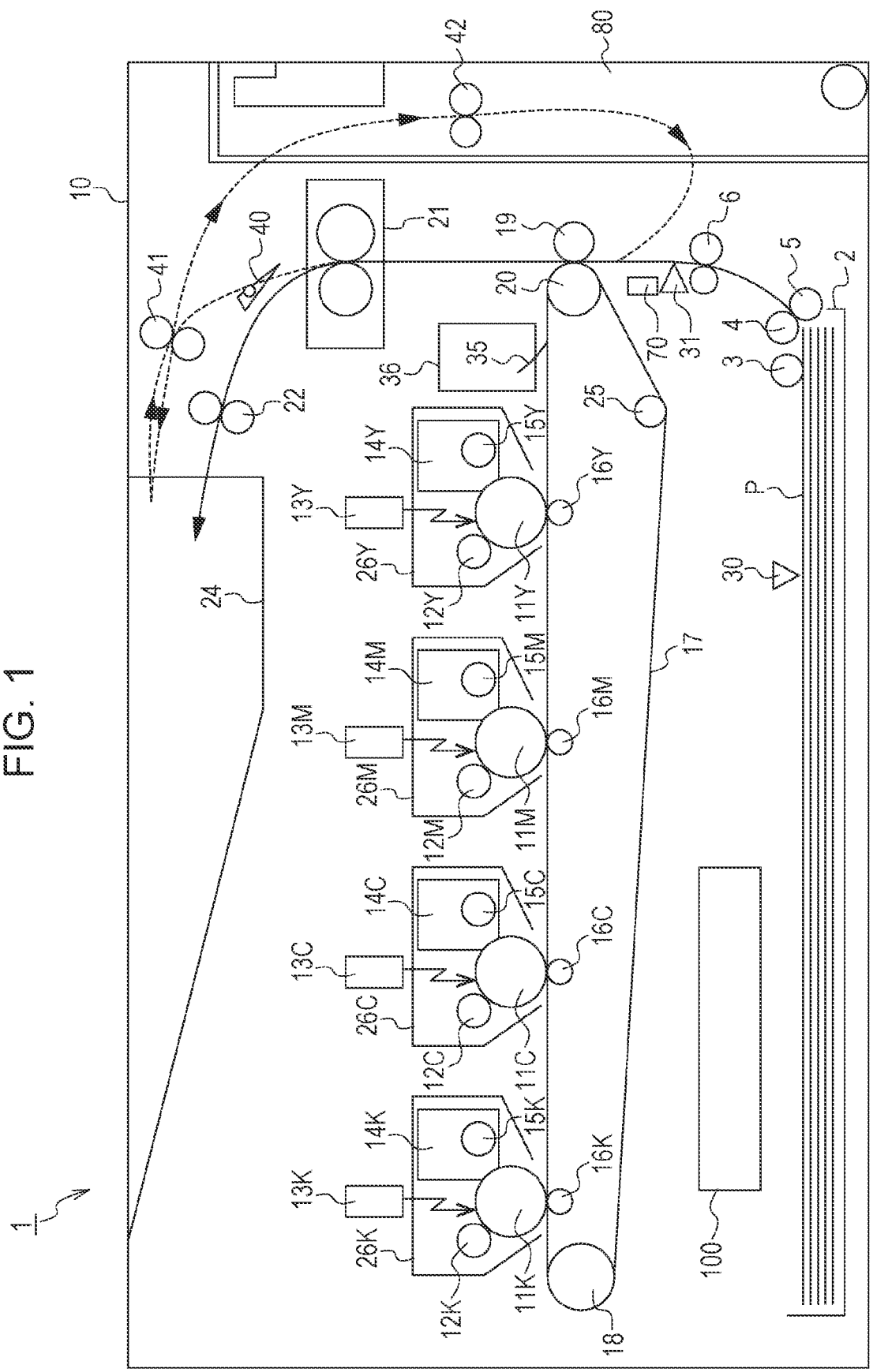
FIG. 1 is a diagram illustrating the configuration of an image forming apparatus according to a first embodiment.

Embodiments will be described in detail hereinafter with reference to the accompanying drawings. The following embodiments do not limit the disclosure according to the claims. While the embodiments describe multiple features, not all of the multiple features are required for the disclosure, and the multiple features may be used in any combination. Further, in the accompanying drawings, the same or similar components are denoted by the same reference numerals, and redundant description thereof will be omitted.

Configuration of Image Forming Apparatus

FIG. 1 is a configuration diagram of an image forming apparatus 1 according to the present embodiment. In FIG. 1, the reference numerals are followed by letters Y, M, C, and K indicating colors of toner, namely, yellow, magenta, cyan, and black, respectively. In the following description, reference numerals without letters appended thereto are used unless the colors are otherwise specified.

A photosensitive member 11 serves as an image bearing member. During image formation, the photosensitive member 11 is rotationally driven in a clockwise direction in FIG. 1. A charging roller 12 charges the surface of the photosensitive member 11 to a predetermined potential. An optical unit 13 exposes the photosensitive member 11 to light to form an electrostatic latent image on the photosensitive member 11. A developing device 14 has a developer. The electrostatic latent image on the photosensitive member 11 is developed by a developing roller 15 to form a developer image (e.g., an image). The photosensitive member 11, the charging roller 12, the developing device 14, and the developing roller 15 are integrated into a unit serving as a cartridge 26, and the cartridge 26 is removably installed in an apparatus main body 10 of the image forming apparatus 1.

A primary transfer roller 16 outputs a primary transfer bias and transfers the electrostatic latent image on the photosensitive member 11 onto an intermediate transfer belt 17 serving as an image bearing member to form a developer image on the intermediate transfer belt 17. The developer images formed on the photosensitive members 11Y, 11M, 11C, and 11K can be transferred onto the intermediate transfer belt 17 in a superimposed manner to form a full-color developer image on the intermediate transfer belt 17.

The intermediate transfer belt 17 is stretched over a belt driving roller 18, a tension roller 25, and a secondary transfer counter roller 20. During image formation, the belt driving roller 18 rotationally drives the intermediate transfer belt 17 in a counter-clockwise direction in FIG. 1 by a driving force from a driving source (not illustrated). As a result, the developer image transferred onto the intermediate transfer belt 17 is conveyed to a position opposing a secondary transfer roller 19.

A pick roller 3 feeds recording media (e.g., paper sheets, or sheets) P stored in a feed cassette 2 to a conveyance path. The recording media P are separated one by one at a nip formed by a feed roller 4 and a separation roller 5 before being conveyed. The pick roller 3, the feed roller 4, and the separation roller 5 form a feeder. The feed cassette 2 is provided with a loaded-amount detection sensor 30 to detect the amount of recording media P loaded therein. The loaded-amount detection sensor 30 is configured as an optical sensor and detects the height of a stack of recording media P to detect the amount of loaded recording media P. A conveyance sensor 31 (e.g., an abnormality detection unit) is disposed on the conveyance path and is configured to monitor the conveyance of the recording media P.

A conveyance roller pair 6 conveys a fed recording medium P to the downstream side of the conveyance path, that is, toward the position opposing the secondary transfer roller 19. The secondary transfer roller 19 outputs a secondary transfer bias and transfers the developer image on the intermediate transfer belt 17 onto the recording medium P. After the transfer of the developer image, the recording medium P is conveyed to a fixing device 21. The fixing device 21 is removably mounted on the apparatus main body 10 of the image forming apparatus 1. The fixing device 21 applies pressure and heat to the recording medium P to fix the developer image on the recording medium P. After the fixing of the developer image, the recording medium P is discharged to the outside of the image forming apparatus 1 by a discharge roller pair 22.

The image forming apparatus 1 also includes a duplex conveyance path indicated by a dotted line in FIG. 1 to enable printing on both sides of the recording medium P. When a user designates double-sided (or duplex) printing, the position of a duplex flapper 40 is determined such that the recording medium P with a first side printed passes through the fixing device 21 and then passes through the duplex conveyance path. The recording medium P having passed through the duplex flapper 40 is switched back by a duplex reversing roller 41, passes through a duplex conveyance roller 42 in a right cover 80, and reaches the position opposing the secondary transfer roller 19 again. At the position, printing is performed on a second side of the recording medium P. The recording medium P with both the first and second sides printed passes through the fixing device 21. At this time, the position of the duplex flapper 40 is switched such that the recording medium P is directed to the discharge roller pair 22. The recording medium P with both the first and second sides printed is discharged to a discharge tray 24.

Figure 2:
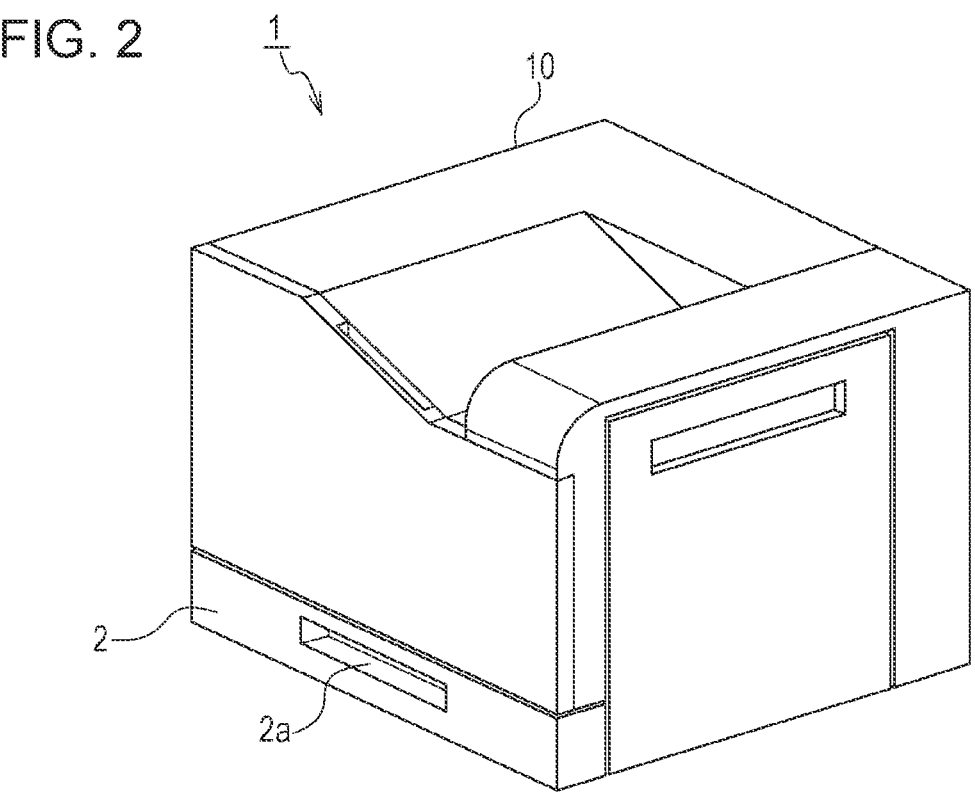
FIG. 2 is a perspective view illustrating the appearance of the image forming apparatus according to the first embodiment.
Figure 3:
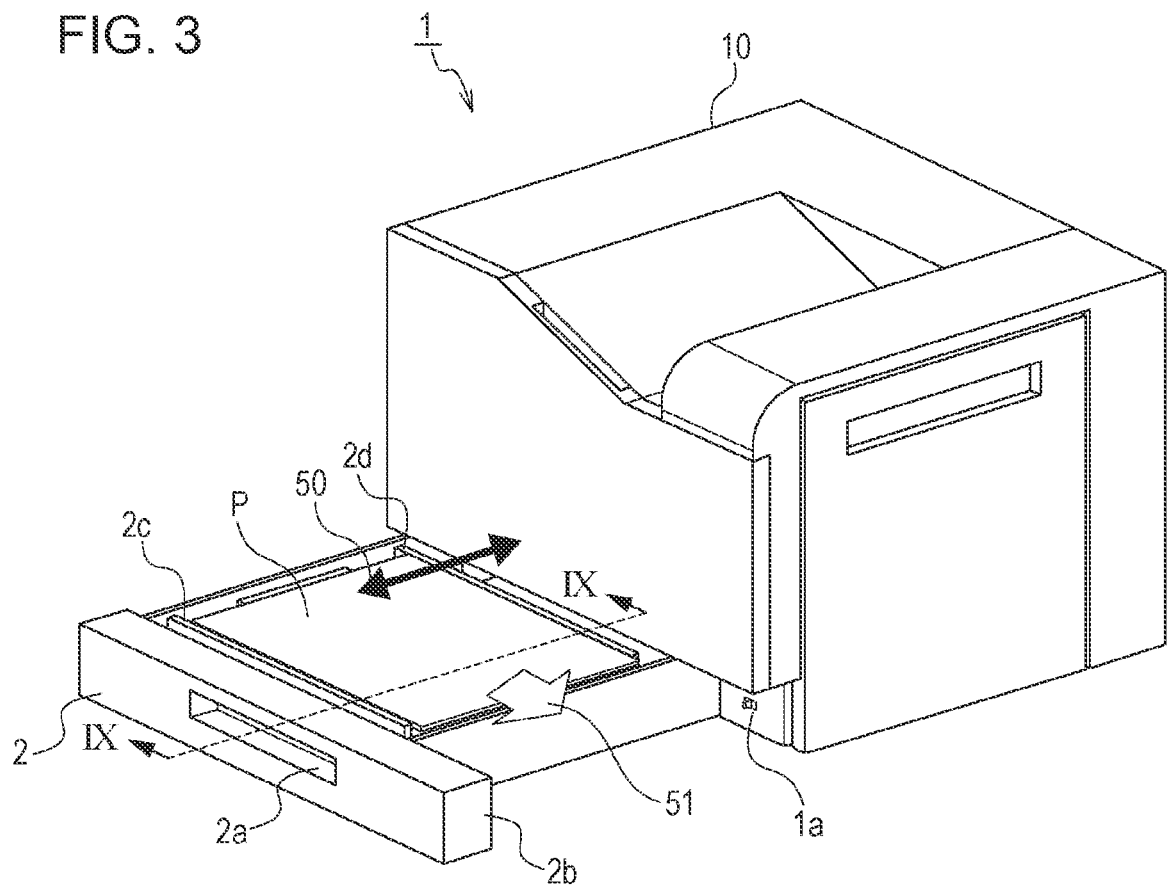
FIG. 3 is a perspective view of the image forming apparatus illustrated in FIG. 2 when a cassette is pulled out from the apparatus main body of the image forming apparatus.

The feed cassette 2 in the image forming apparatus 1 is removably installed in the apparatus main body 10 to supply recording media P. FIG. 2 is a schematic perspective view of the image forming apparatus 1. FIG. 3 is a schematic perspective view of the image forming apparatus 1, illustrating a state in which the feed cassette 2 is pulled out from the apparatus main body 10 of the image forming apparatus 1. As illustrated in FIG. 3, the apparatus main body 10 of the image forming apparatus 1 is provided with a push-type cassette switch 1a serving as a state detection unit for detecting the installation or removal of the feed cassette 2. The cassette switch 1a changes in output voltage between a pressed state and a non-pressed state.

When pressed against a cassette-switch pressing surface 2b formed on the feed cassette 2, the cassette switch 1a detects the installation of the feed cassette 2. The feed cassette 2 is removably installed along a guide rail (not illustrated) disposed in the apparatus main body 10 of the image forming apparatus 1. To supply recording media P, the user grips a cassette grip 2a formed in the feed cassette 2 and pulls out the feed cassette 2 in the left direction indicated by a black arrow 50 illustrated in FIG. 3. At this time, the cassette switch 1a and the cassette-switch pressing surface 2b are separated from each other. Thus, it is detected that the feed cassette 2 is pulled out. After the supply of recording media P, the feed cassette 2 is inserted into the apparatus main body 10, thereby allowing the cassette-switch pressing surface 2b to press down the cassette switch 1a. Thus, it is detected that the feed cassette 2 is installed.

The recording media P are fed in a direction indicated by a white arrow 51. The feed cassette 2 is further provided with side regulating plates 2c and 2d, and the recording media P are held in the feed cassette 2 at a predetermined position by the side regulating plates 2c and 2d.

Referring back to FIG. 1, the image forming apparatus 1 includes a sound collector 70 (e.g., a physical quantity detection unit) that detects sound. In the present embodiment, the sound collector 70 is a micro-electro-mechanical system (MEMS) microphone that converts a displacement in the vibration of a vibrating plate caused by pressure into a change in voltage and outputs the change in voltage. The sound collector 70 may be a microphone, other than a MEMS microphone, capable of receiving sound waves in the audible range, such as a condenser microphone.

Configuration of Image Forming System

Figure 4:
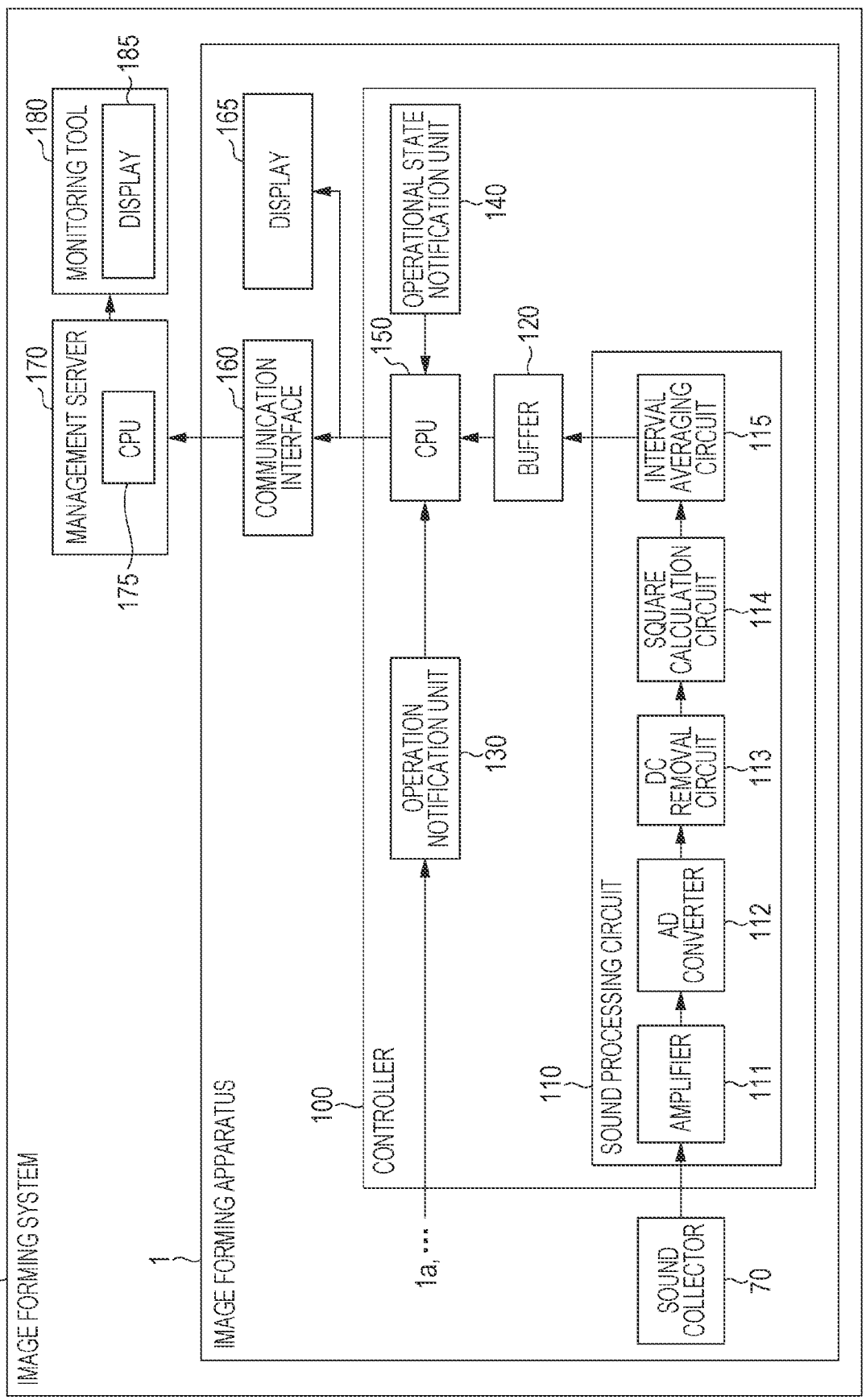
FIG. 4 is a block diagram illustrating the configuration of an image forming system according to the first embodiment.

FIG. 4 is a block diagram illustrating the configuration of an image forming system 200 according to the present embodiment. The image forming system 200 includes the image forming apparatus 1, a management server 170 (e.g., a management apparatus), and a monitoring tool 180. The management server 170 manages the image forming apparatus 1. The monitoring tool 180 is for a service engineer who performs maintenance and inspection of the image forming apparatus 1.

A controller 100 of the image forming apparatus 1 includes a sound processing circuit 110, a buffer 120, an operational state notification unit 130, an operating state notification unit 140, and a central processing unit (CPU) 150. The sound processing circuit 110 includes an amplifier 111, an analogue-to-digital (AD) converter 112, a direct-current (DC) removal circuit 113, a square calculation circuit 114, and an interval averaging circuit 115. The sound processing circuit 110 will be described in detail below. The CPU 150 is connected to a communication interface 160 and a display 165.

The operational state notification unit 130 monitors the state of one or more variable mechanisms of the image forming apparatus 1, based on a state detection signal input from a state detection unit such as the cassette switch 1a. When a change in the state of a certain variable mechanism is detected from a change in the voltage of the state detection signal, the operational state notification unit 130 notifies the CPU 150 of the change in the state. The operational state notification unit 130 may also notify the CPU 150 of information for identifying the variable mechanism whose state has changed.

The operating state notification unit 140 notifies the CPU 150 of position information of a currently conveyed recording medium P that is read by the conveyance sensor 31, operation information of motors and various actuators included in the image forming apparatus 1, or operation information of electric components such as a power supply. The operating state notification unit 140 may be disposed for each sensor or actuator. As a result, a plurality of operating state notification units 140 may be provided.

The CPU 150 is a processor that controls the operation of the image forming apparatus 1. In addition to controlling the normal image forming operation, the CPU 150 determines the operating state of the image forming apparatus 1 from the information notified to the CPU 150 by the operating state notification unit 140, such as the position information of the recording medium P and the operation information of each component, and determines whether to continue or stop the operation of the image forming apparatus 1. That is, the CPU 150 determines whether an abnormal condition has occurred. For example, if a recording medium P is not detectable by the conveyance sensor 31 for a period of time from when the recording medium P starts to be fed until a predetermined timing is reached, the CPU 150 determines that a jam (also referred to as a paper jam) has occurred. Then, the CPU 150 stops the operation of the image forming apparatus 1. The operation of the image forming apparatus 1 may be stopped for other reasons such as a temperature failure of the fixing device 21 and abnormalities in the speeds of the photosensitive member 11 and the intermediate transfer belt 17.

The communication interface 160 is an interface for the image forming apparatus 1 to communicate with another apparatus. The communication interface 160 may be a wired interface or a wireless interface. The display 165 is a device that displays information generated by the CPU 150. The operation information of the image forming apparatus 1 and information relating to a malfunction of the image forming apparatus 1, which are output from the CPU 150, are displayed on the display 165.

Like the controller 100, the management server 170 includes a CPU 175. The CPU 150 can transmit information to the management server 170 via the communication interface 160. The CPU 175 of the management server 170 performs various analyses based on the received information. The monitoring tool 180 includes a display 185. The CPU 175 can transmit an analytical result useful for a service engineer to perform maintenance and inspection of the image forming apparatus 1 to the monitoring tool 180 to display the analytical result on the display 185.

The service engineer receives information relating to a malfunction of the image forming apparatus 1, thereby being able to instruct the user how to address the malfunction of the image forming apparatus 1 while staying in a remote location, replace a worn unit for periodic replacement, or visit the user to repair a failed portion.

Mechanism of Sound Detection

Next, a mechanism of sound detection used in the present embodiment will be described with reference to FIG. 4. In FIG. 4, the sound processing circuit 110 includes the amplifier 111, the AD converter 112, the DC removal circuit 113, the square calculation circuit 114, and the interval averaging circuit 115.

The sound collector 70 acquires a sound wave in the audible range, which is generated when the user physically operates a variable mechanism of the image forming apparatus 1, and outputs a sound wave level signal to the amplifier 111. The sound wave level signal is an analogue signal indicating the level of the acquired sound wave. The amplifier 111 amplifies the sound wave level signal and outputs the amplified signal to the AD converter 112. The AD converter 112 converts the format of the signal input from the amplifier 111 from an analogue format to a digital format, and outputs the sound wave level signal in the digital format to the DC removal circuit 113. The DC removal circuit 113 removes the DC component from the sound wave level signal input from the AD converter 112 to convert the sound wave level signal into a signal indicating only a fluctuation in sound wave level (sound pressure), and outputs the signal obtained by the conversion to the square calculation circuit 114. In the sound wave level signal from which the DC component is removed, the fluctuation in sound pressure is indicated by a signed numerical value. The square calculation circuit 114 squares the value of the sound wave level signal input from the DC removal circuit 113 and outputs the squared signal to the interval averaging circuit 115. In the squared sound wave level signal, the magnitude of the fluctuation in sound pressure is indicated by a positive numerical value. The interval averaging circuit 115 calculates, for each time interval having a predetermined time length, an interval average of the sound wave level signal input from the square calculation circuit 114. Each time interval may have a fixed time length such as 2 ms, for example. Alternatively, the interval averaging circuit 115 may apply different time lengths to the respective time intervals depending on the type of sound detected. The sound wave level signal is shaped, through the squaring and interval averaging described above, into time-series sound wave level data indicating the magnitude of the fluctuation in sound pressure for each time interval. The interval averaging circuit 115 sequentially transmits sound wave level data as a result of the interval averaging to the buffer 120.

When a change in the state of a variable mechanism of the image forming apparatus 1 is detected, the CPU 150 generates statistical information relating to a sound wave acquired by the sound collector 70, based on the sound wave level data stored in the buffer 120. As an example, the CPU 150 acquires the sound wave levels before and after the time point at which the change in state is detected from the buffer 120, and generates statistical information relating to the sound wave from the acquired sound wave levels. The statistical information relating to the sound wave generated by the CPU 150 may include one or more of an average value, a maximum value, and an integrated value of the acquired sound wave levels in the time interval. Such statistical information may be used as an index for evaluating the strength of the force applied to the variable mechanism when the variable mechanism is operated by the user.

Method for Acquiring Operation Sound

Figure 5:
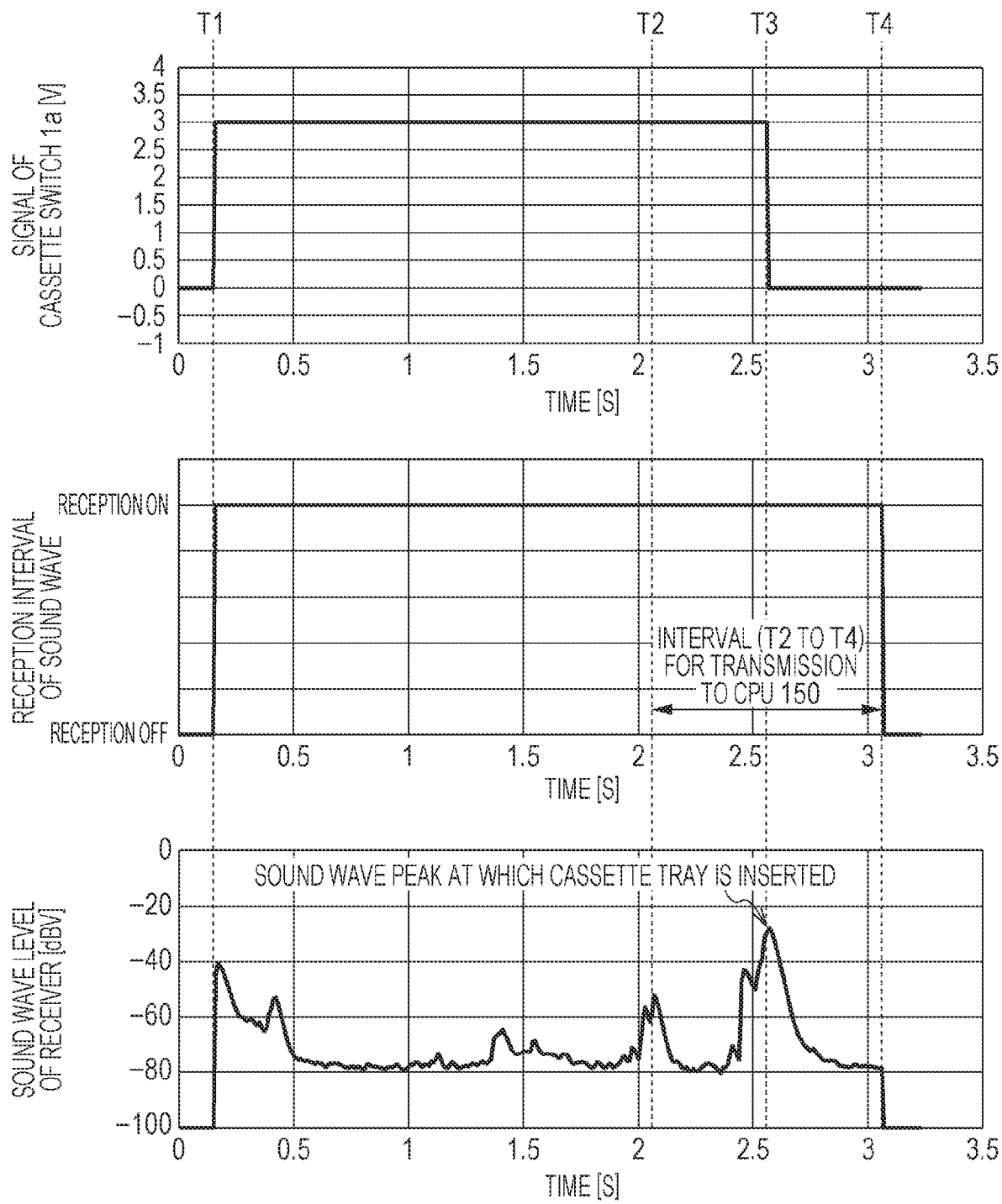
FIG. 5 depicts graphs illustrating a signal of a cassette switch, an interval over which a sound collector receives a sound wave, and a sound wave level detected by the sound collector when the cassette is inserted.

A method for acquiring a sound wave (i.e., an operation sound) produced when the variable mechanism is operated by the user will be described with reference to FIG. 5. FIG. 5 depicts graphs illustrating the voltage value of the state detection signal output from the cassette switch 1a, the interval over which the sound collector 70 receives a sound wave, and the sound wave level received by a receiver when the feed cassette 2 serving as a variable mechanism is installed into and removed from the apparatus main body 10 of the image forming apparatus 1. In the present embodiment, a state in which the feed cassette 2 is removed from the apparatus main body 10 is a first state, and a state in which the feed cassette 2 is installed in the apparatus main body 10 is a second state. In this case, an operation sound produced when the state of the feed cassette 2 changes from the first state to the second state is detected.

The signal of the cassette switch 1a changes from a low level to a high level at time T1.

This indicates that the feed cassette 2 is taken out of the apparatus main body 10. At the time T1, the sound collector 70 starts receiving the sound wave. At time T3, the signal of the cassette switch 1a changes from the high level to the low level. This indicates that the feed cassette 2 is completely inserted into the apparatus main body 10. In the present embodiment, the sound wave produced when the feed cassette 2 is inserted into the apparatus main body 10 is captured to evaluate the strength of the force applied to the feed cassette 2 when the feed cassette 2 is inserted into the apparatus main body 10. To capture the sound wave produced when the feed cassette 2 is inserted into the apparatus main body 10, the sound collector 70 receives the sound wave for a period of time from when the signal of the cassette switch 1a changes to the low level until a predetermined time (T4) is reached.

As described above, the sound wave level data received by the sound collector 70 is transmitted to the buffer 120 at any time. The CPU 150 receives only required data from the buffer 120. The required data is only the data before and after a sound wave peak at which the feed cassette 2 is inserted into the apparatus main body 10, including the sound wave peak. Thus, the CPU 150 receives sound wave level data over a period of time from time T2 to time T4, including the sound wave level data of the sound wave peak. In this way, acquiring the sound wave level data synchronized with the signal of the cassette switch 1a makes it possible to distinguish the sound of the operation of the feed cassette 2 from other sounds (such as sounds outside the image forming apparatus 1). As a result, the sound produced when the feed cassette 2 is inserted into the apparatus main body 10 can be accurately detected.

Change in Sound Wave Level due to Difference in Cassette Operation Strength

Figure 6:
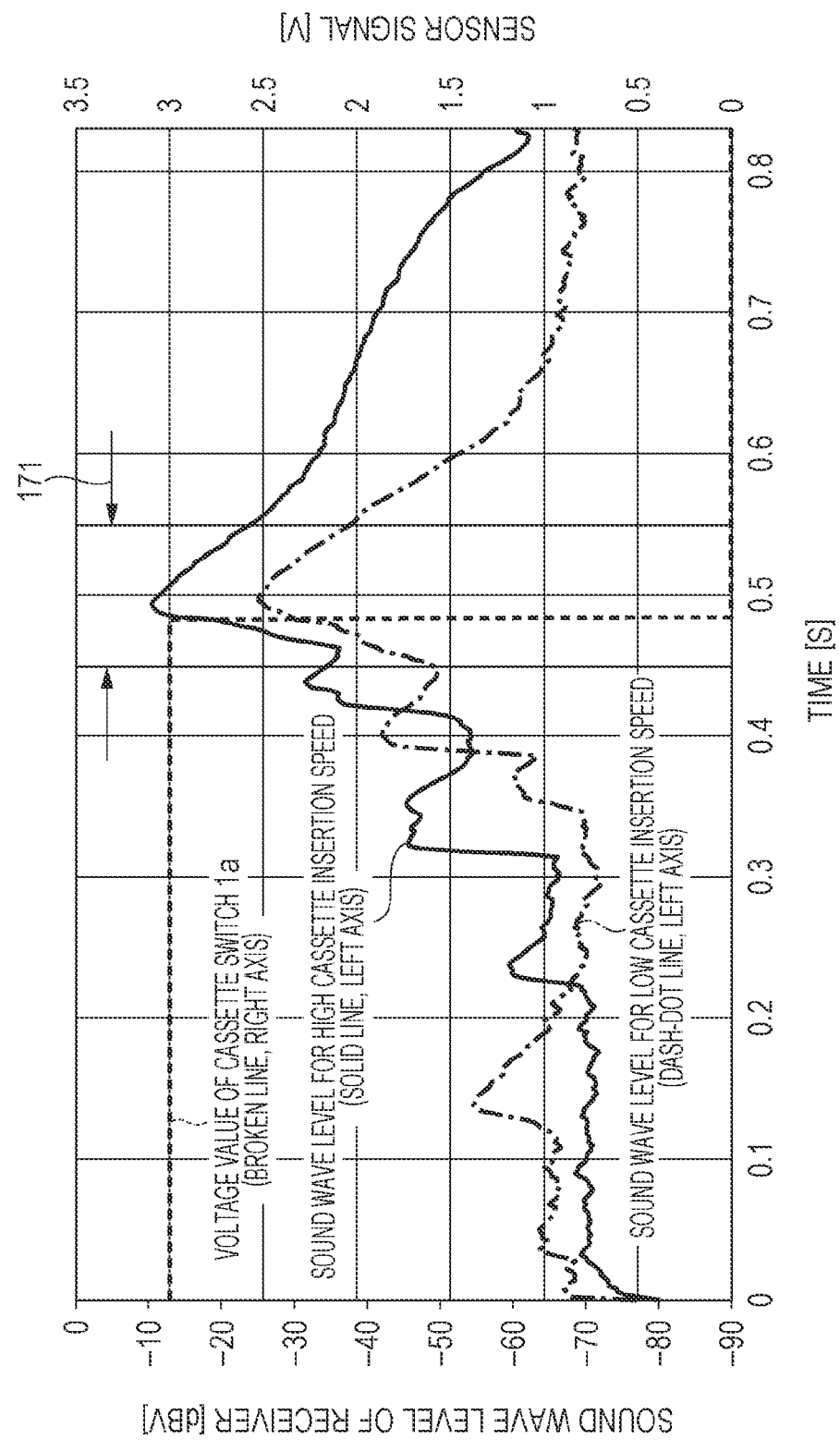
FIG. 6 depicts a graph illustrating sound wave levels represented in time series when the cassette is inserted.

FIG. 6 illustrates sound wave levels received over the interval from the time T2 to the time T4 in FIG. 5, that is, the sound wave level data transmitted to the CPU 150. In the graph, the horizontal axis represents time (s), and the left vertical axis (left axis) represents sound wave level. The right vertical axis (right axis) represents the voltage value of the state detection signal output from the cassette switch 1a. In FIG. 6, the magnitude of the voltage value is indicated by a broken line.

In FIG. 6, a solid line indicates a case where the feed cassette 2 is operated with a relatively strong force, and a dash-dot line indicates a case where the feed cassette 2 is operated with a relatively weak force. As illustrated in FIG. 6, in the case where the feed cassette 2 is inserted at a high speed with strong operation strength, the sound wave level shows high values before and after time T=0.5, in particular, as compared with the case where the feed cassette 2 is inserted at a low speed with weak operation strength. Accordingly, for example, the statistical value such as the average value, the maximum value, or the integrated value of sound wave levels over an interval 171 including the time T=0.5 is analyzed, thereby making it possible to evaluate whether the user has appropriately operated the feed cassette 2. In the present embodiment, the CPU 150 calculates the average value of the sound wave levels over the interval 171 and uses the average value as the index of the strength with which the user operates the feed cassette 2. In the example illustrated in FIG. 6, the interval 171 is an interval of 100 milliseconds from time T=0.45 to time T=0.55.

Figure 7:
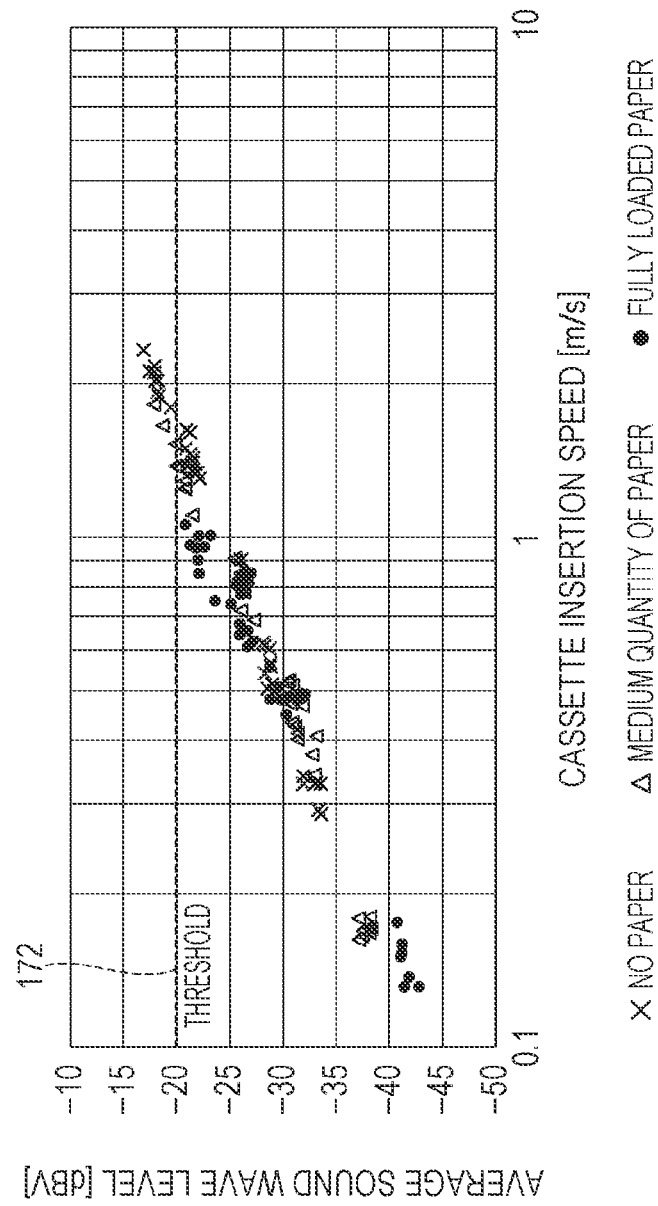
FIG. 7 depicts a graph illustrating the relationship between the insertion speed of the cassette and the average sound wave level of an insertion sound (100 ms average).

FIG. 7 depicts a graph illustrating the relationship between the insertion speed (m/s) of the feed cassette 2 and the average value (dBV) of sound wave levels generated during the insertion of the feed cassette 2. In the graph, the horizontal axis represents the cassette insertion speed (m/s), and the vertical axis represents the average sound wave level (dBV). In the graph, a cross sign (x) indicates an actual measurement value in a state in which no recording media P are loaded in the feed cassette 2. A triangle sign indicates an actual measurement value in a state in which recording media P are loaded in the feed cassette 2 at a medium level of availability (e.g., 10% to 80% of the cassette capacity). A black circle indicates an actual measurement value in a state in which the feed cassette 2 is fully loaded with recording media P (at a level greater than or equal to 80% of the cassette capacity).

As can be seen from FIG. 7, the average sound wave level generated with the insertion of the feed cassette 2 is proportional to the cassette insertion speed, and does not substantially depend on the amount of recording media P loaded in the feed cassette 2. Accordingly, the average sound wave level of the operation sound produced when the feed cassette 2 is operated can be used to estimate the index value such as the speed or acceleration of the feed cassette 2 or the force applied to the feed cassette 2 when the feed cassette 2 is operated.

In FIG. 7, a threshold 172 for determining that the force applied to the feed cassette 2 is strong is set to −20 dBV, as an example. In the following description, the application of a strong force to a variable mechanism including the feed cassette 2 is referred to as "strong operation". Other variable mechanisms include an opening and closing cover and a unit removably attachable to the apparatus main body 10. Since the distances from the sound collector 70 to the individual variable mechanisms are different, in one example, a threshold for determining that strong operation has occurred is individually set for each variable mechanism. In an apparatus configuration with multiple stages of feed cassettes 2, a threshold for determining that strong operation has occurred may be individually set for each of the feed cassettes 2.

Figure 8:
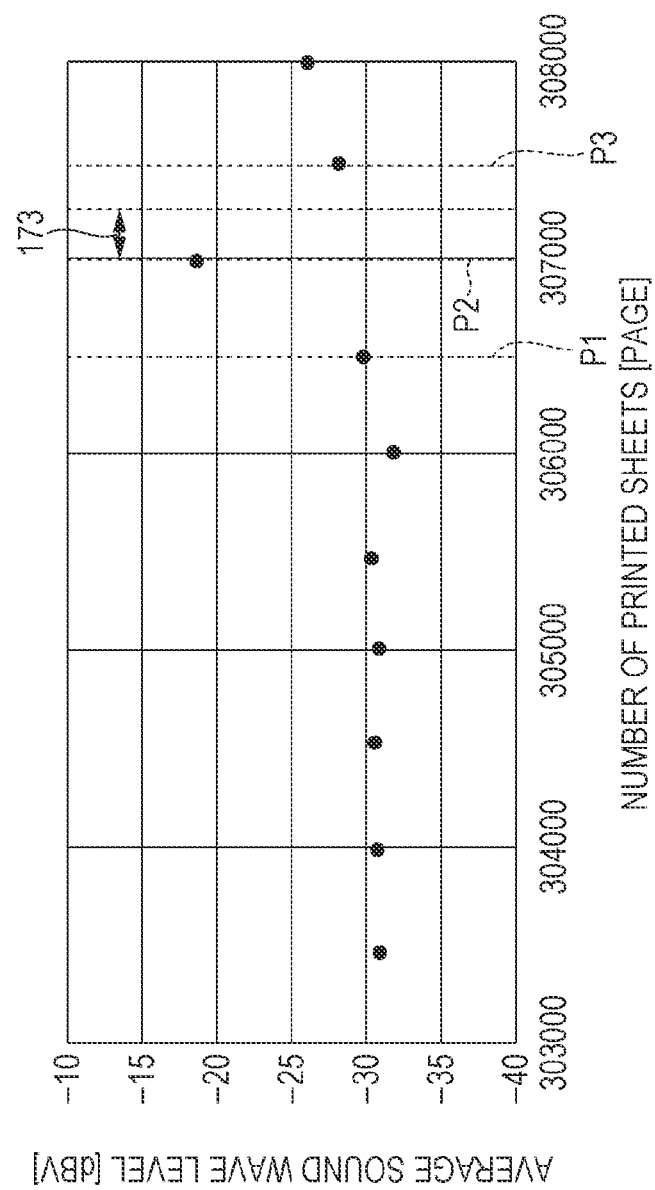
FIG. 8 depicts a graph illustrating a change in cassette insertion sound with respect to the number of printed sheets.

FIG. 8 depicts a graph illustrating changes in the number of sheets printed by the image forming apparatus 1 and the average sound wave level produced during the insertion of the feed cassette 2. In the illustrated example, the feed cassette 2 can accommodate up to 500 recording media P. Thus, each time approximately 500 sheets are printed, the opening and closing of the feed cassette 2 is performed to load recording media P in the feed cassette 2.

In FIG. 8, the insertion of the feed cassette 2 is inserted at a value less than or equal to a threshold of −20 dBV up to the number of printed sheets P1. This indicates that the feed cassette 2 is inserted with a relatively weak force. At the number of printed sheets P2, in contrast, a sound wave level higher than a threshold of −20 dBV is detected. This indicates that strong operation is performed. After the number of printed sheets P3, the sound wave level becomes less than or equal to a threshold of −20 dB again. This indicates that the feed cassette 2 is inserted with a relatively weak force.

Whether strong operation is performed may be determined in the following way. It may be determined that strong operation is performed when the threshold is exceeded once or when the threshold is exceeded a plurality of times. Alternatively, whether strong operation is performed may be determined based on a relative change in sound wave level to eliminate the influence of variations in the sensitivity of the sound collector 70 or the influence of variations in insertion sound for each apparatus. The determination based on a relative change is a method of setting, as an initial value, the sound wave level in a condition where the operation strength is weak and determining whether strong operation is performed on the basis of the amount of change in sound wave level from the initial value.

Occurrence of Jam Due to Strong Operation of Cassette

In the present embodiment, the presence or absence of strong operation and the features of the jam phenomenon that can be caused by strong operation, described below, are combined to identify that the cause of the jam is strong operation.

First, an example of a jam caused by strong operation will be described with reference to FIGS. 9A to 11D.

FIGS. 9A to 9D are views of the feed cassette 2, illustrating the position or posture of the recording media P in the feed cassette 2 when the feed cassette 2 is strongly operated. The views illustrated in FIGS. 9A to 9D represent a cross section taken along line IX-IX in FIG. 3, and members of the image forming apparatus 1 other than the feed cassette 2 are not illustrated.

Figure 9A:
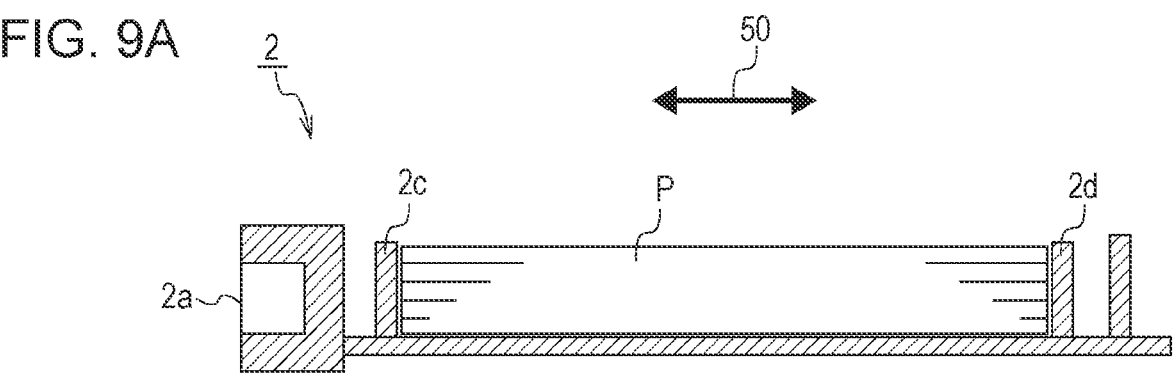
FIGS. 9A to 9D are sectional views of the cassette, illustrating examples of a state in which the cassette is strongly operated.
Figure 9B:
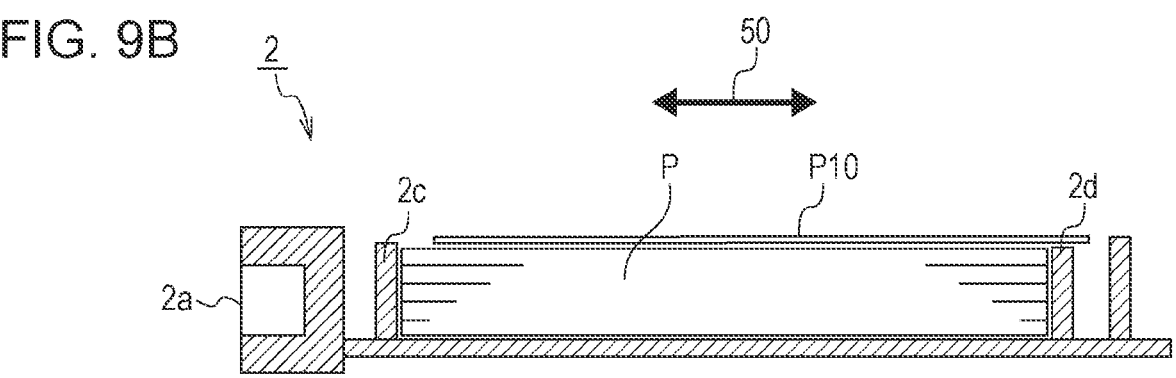
Figure 9C:
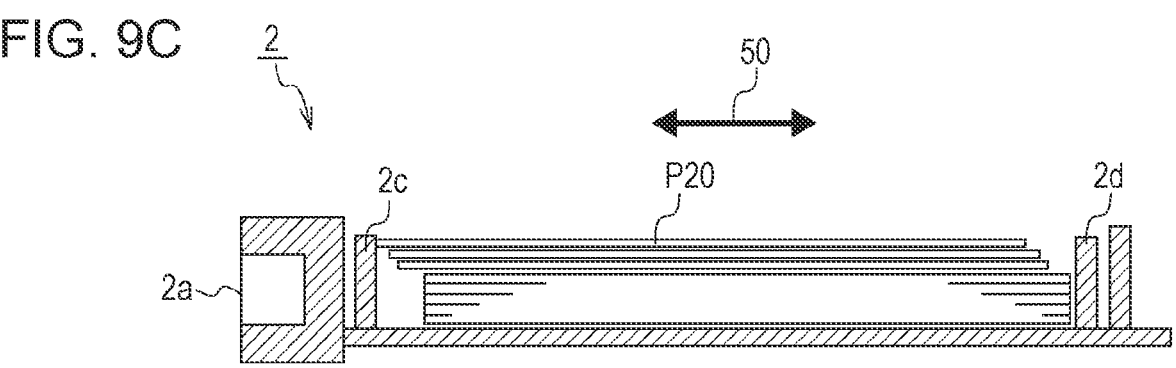
Figure 9D:
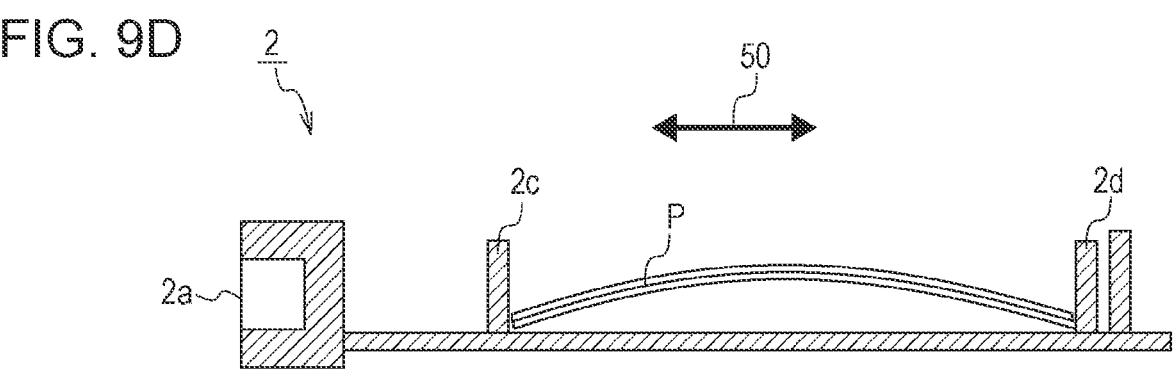

FIG. 9A illustrates a normal state in which no strong operation has occurred. FIGS. 9B to 9D illustrate states in which strong operation has occurred. In the state illustrated in FIG. 9B, the amount of loaded recording media P is large. When the feed cassette 2 is strongly operated and suddenly stops, the inertia force acts on several top recording media P10. Due to the inertia force, the recording media P10 ride over the side regulating plate 2d. Also, in the state illustrated in FIG. 9C, the amount of loaded recording media P is large. When the feed cassette 2 is strongly operated, the side regulating plates 2c and 2d are displaced outward due to the weight of the recording media P, resulting in a shift in the position of several top recording media P20. In the state illustrated in FIG. 9D, the amount of loaded recording media P is small. When the feed cassette 2 is strongly operated, the side regulating plates 2c and 2d are displaced inward, resulting in bending of the recording media P. As illustrated in FIGS. 9B to 9D, if the recording media P are not in correct position or posture due to strong operation, a jam is likely to occur during image formation.

In FIG. 3, the direction in which the feed cassette 2 is inserted into and removed from the image forming apparatus 1 is indicated by the black arrow 50 in FIG. 3 and is orthogonal to the feeding direction of the recording media P indicated by the white arrow 51 in FIG. 3. However, the present disclosure is not limited to this configuration. A jam caused by strong operation in an image forming apparatus 300 having a configuration different from that of the image forming apparatus 1 illustrated in FIGS. 1 to 3 will be described with reference to FIGS. 10A to 11D.

Figure 10A:
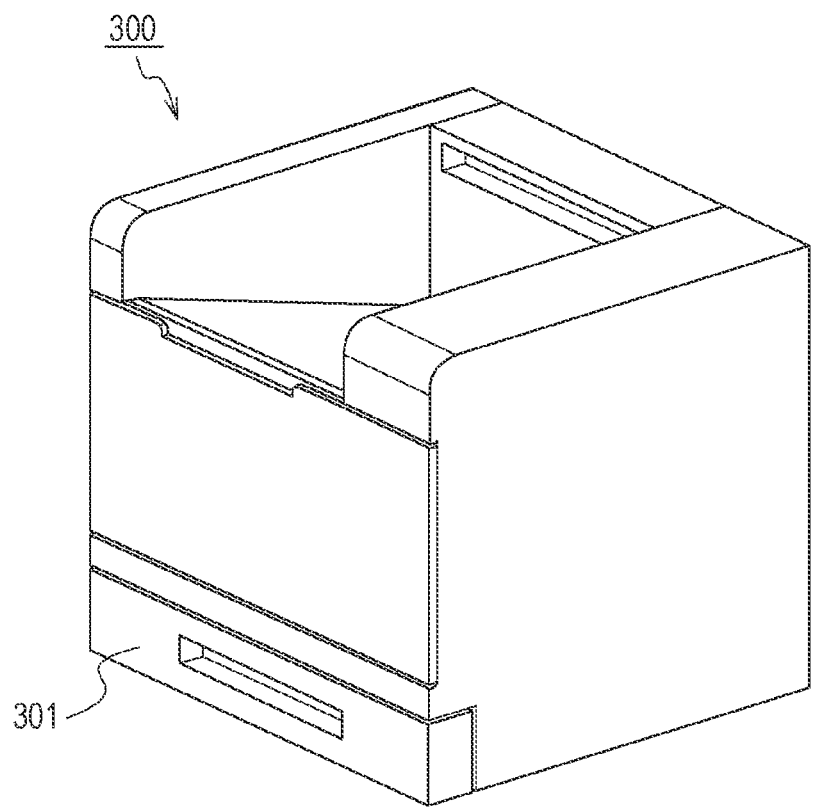
FIGS. 10A and 10B are perspective views illustrating the appearance of an image forming apparatus having another configuration according to the first embodiment.
Figure 10B:
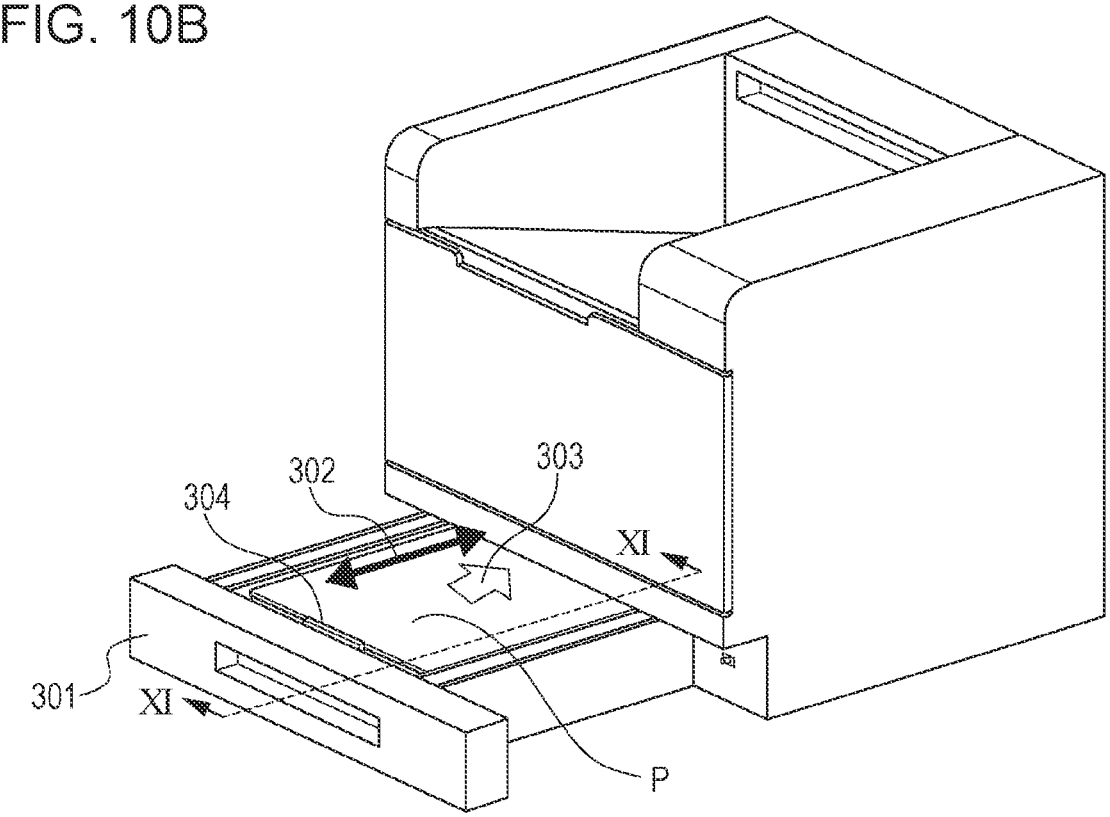
Figure 11A:
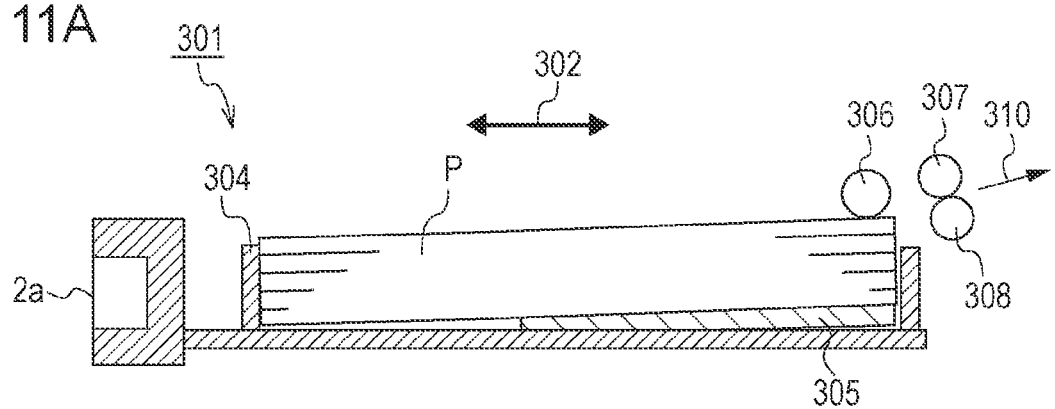
FIGS. 11A to 11D are sectional views of a cassette of the image forming apparatus illustrated in FIGS. 10A and 10B when the cassette is strongly operated.

As illustrated in FIGS. 10A and 10B, a direction 302 in which a feed cassette 301 is inserted into and removed from the image forming apparatus 300 and a feeding direction 303 of the recording media P are parallel to each other. FIGS. 11A to 11D illustrate a cross section taken along line XI-XI in FIG. 10B. FIG. 11A illustrates a normal state in which no strong operation has occurred. When the feed cassette 301 is inserted into the image forming apparatus 300, a lifter plate 305 lifts up the recording media P such that the recording media P can be conveyed in a conveyance direction 310 by a pick roller 306 and a feed roller 307. The feed roller 307 and a separation roller 308 form a separation nip, at which the recording media P are separated one by one.

Figure 11B:
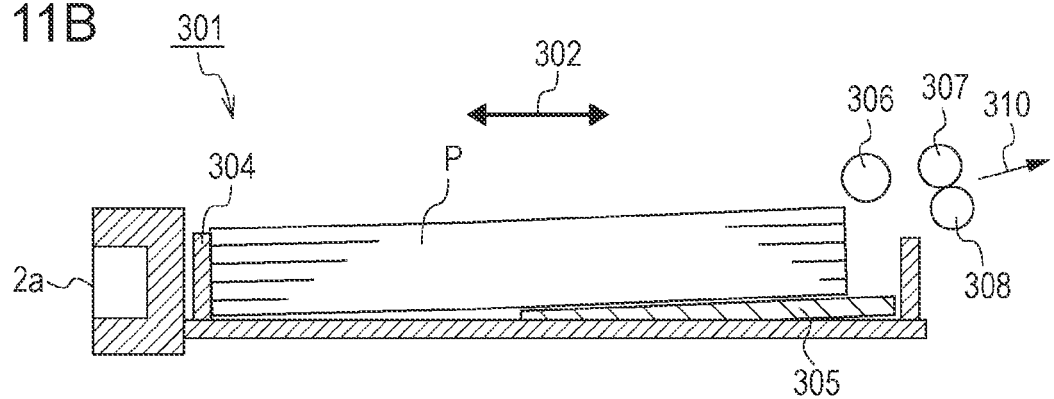
Figure 11C:
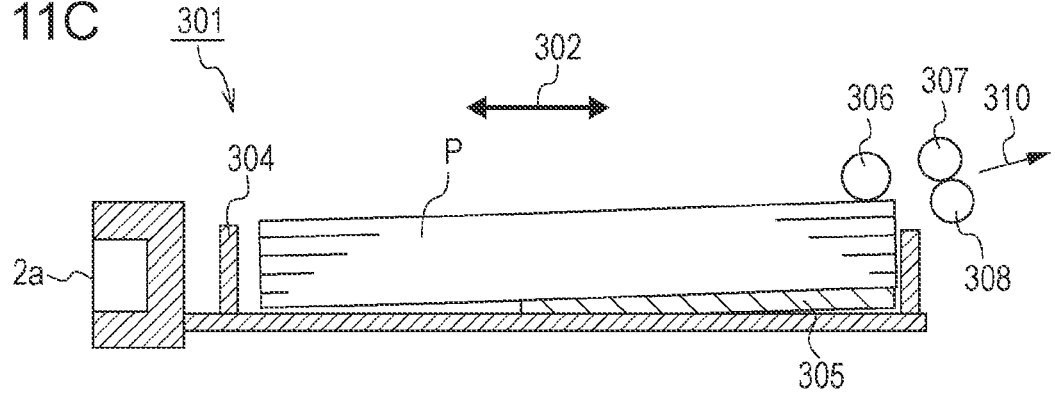

FIG. 11B illustrates a state in which a trailing-edge regulating plate 304 is moved to the left in FIG. 11B due to strong operation. A large movement of the trailing-edge regulating plate 304 may cause the recording media P to be separated from the pick roller 306. At this time, the pick roller 306 fails to feed the recording media P. FIG. 11C illustrates a state in which the recording media P are kept in position, whereas only the trailing-edge regulating plate 304 is displaced. In the image forming apparatus 300, the size of the recording media P may be set from position information of the trailing-edge regulating plate 304. The set size and the actual length size of the recording media P, which is measured by a sensor disposed in the conveyance path, such as the conveyance sensor 31 illustrated in FIG. 1, may be used to perform conveyance control of the recording media P. If the trailing-edge regulating plate 304 is displaced in the manner as illustrated in FIG. 11C, a difference occurs between the set size and the actual length size, and it is determined that an abnormality in size mismatch of the recording media P has occurred. As a result, the image forming operation is stopped. Examples of the method for measuring the actual length size of the recording media P by using the conveyance sensor 31 includes a method for multiplying the speed of the recording media P by the time taken from when the conveyance sensor 31 detects the leading edge of the recording media P to when the conveyance sensor 31 detects the trailing edge of the recording media P.

Figure 11D:
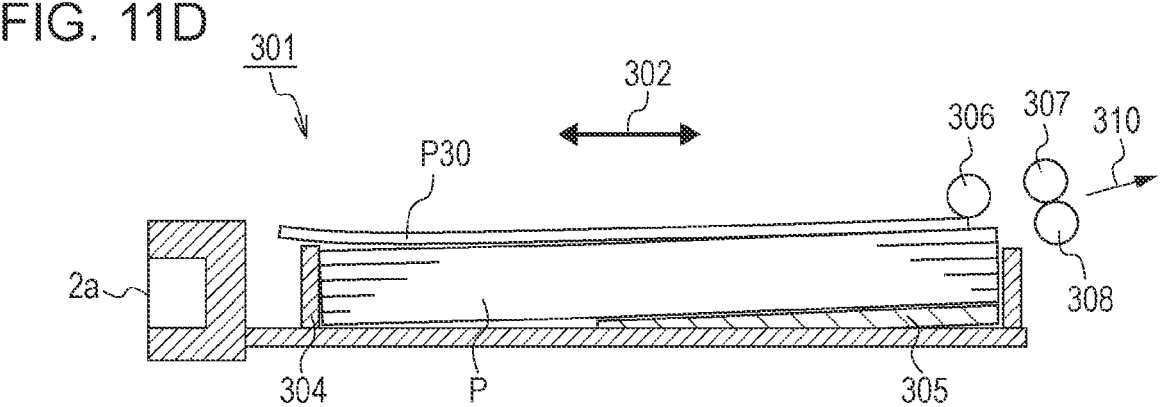

In a state illustrated in FIG. 11D, the amount of loaded recording media P is large. When the feed cassette 301 is strongly operated and suddenly stops, the inertia force acts on several top recording media P30. Due to the inertia force, the recording media P30 ride over the trailing-edge regulating plate 304. If the recording media P30 ride over the trailing-edge regulating plate 304 in the manner as illustrated in FIG. 11D, more time is taken for the recording media P30 to reach the conveyance sensor 31 disposed downstream of the feed roller 307 in the conveyance direction after starting to be fed. As a result, the threshold time for determining a jam is exceeded, and the CPU 150 determines that a jam has occurred even though no jam has actually occurred.

As described above, if the feed cassette 301 is strongly operated, the position or posture of the recording media P in the feed cassette 301 may be displaced, regardless of the relationship between the direction of insertion and removal of the feed cassette 301 and the feeding direction of the recording media P, resulting in the occurrence of a jam.

Identification of the Cause of a Jam Due to Strong Operation of Cassette

To identify strong operation as the cause of the jam that has occurred due to the phenomenon described above, in one example, various conditions such as the relationship between the occurrence timing of the strong operation and the occurrence timing of the jam, the relationship between the occurrence location of the strong operation and the position of the jam, and the amount of paper loaded in the cassette are added to a determination condition.

First, the relationship between the occurrence timing of the strong operation and the occurrence timing of the jam will be described with reference back to FIG. 8. As described above, in FIG. 8, strong operation occurs at the number of printed sheets P2. As described with reference to FIGS. 9A to 9D and 11A to 11D, if strong operation of the cassette occurs, a jam is likely to occur immediately after the strong operation. Accordingly, it can be determined that a jam that has occurred in a range from the number of printed sheets P2 at which the strong operation was detected to a predetermined number of printed sheets 173 is likely to be caused by the strong operation. The addition of the relationship between the occurrence timing of strong operation and the occurrence timing of a jam to a determination condition makes it possible to more accurately identify the strong operation as the cause of the jam. The predetermined number of printed sheets 173 may be the number of sheets (e.g., 173 in FIG. 8) printed until the feed cassette 2 is opened and closed next, or may be defined by the number of sheets printed after the occurrence of the strong operation. Alternatively, the range may be defined by time rather than the number of printed sheets.

Next, the relationship between the occurrence location of the strong operation and the position of the jam will be described. The addition of the occurrence location of strong operation and the position of a jam to a determination condition for identifying the cause also provides improved cause identification accuracy. For example, an apparatus configuration with multiple stages of cassettes, even if a jam occurs in a cassette lower than a strongly operated cassette for which strong operation has occurred (i.e., a cassette located upstream of the strongly operated cassette in the conveyance direction of the recording media P), the jam has no causal relationship with the strong operation. Thus, in this case, it is not determined that the cause of the jam is the strong operation. A jam that occurs in a feeder other than the cassettes, such as a manual feed tray, also has no causal relationship with strong operation of a cassette. Thus, it is not determined that the cause of the jam is the strong operation. In contrast, if there is a causal relationship between the occurrence location of strong operation and the position of a jam, such as when a recording medium P is fed from a strongly operated cassette for which strong operation has occurred and is jammed, the jam is likely to be caused by the strong operation.

As described above, the amount of paper loaded in the cassette affects the displacement of the position or posture of the recording media P in the cassette or the displacement of the regulating plates. Thus, the addition of the amount of paper loaded in the cassette to a determination condition for identifying the cause of a jam provides improved accuracy of identifying the cause of a jam.

The conditions described above are illustrated in FIG. 12. In Case 1, strong operation of the feed cassette 2 does not occur. Thus, even if a jam occurs, it is not determined that the jam is caused by strong operation. In Case 2, strong operation of the feed cassette 2 has occurred. Although a jam occurs up to a predetermined number of printed sheets after the occurrence of the strong operation, the occurrence of the jam is not included in a predetermined interval. Thus, it is not determined that the jam is caused by the strong operation. The predetermined interval is an interval over which a recording medium P located downstream of a strongly operated cassette is conveyed. In Case 3, the number of sheets printed over a period of time from when strong operation occurs to when a jam occurs is not within a predetermined number of printed sheets. Thus, it is not determined that the jam is caused by the strong operation. In Case 4, the amount of loaded paper is medium (e.g., 10% to 80% of the cassette capacity). Thus, a jam is less likely to be caused by strong operation, and it is not determined that the jam is caused by the strong operation. In Case 5, as described above, a jam occurs in a predetermined printing interval after strong operation occurs, and the amount of loaded paper at the time of occurrence of the jam is full (e.g., 80% or more of the cassette capacity). Thus, it is determined that the jam is likely to be caused by the strong operation. In Case 6, the same conditions as those in Case 5 are satisfied, except that the amount of loaded paper is small (e.g., 10% or less of the cassette capacity). Thus, it is also determined that the jam is likely to be caused by the strong operation. The conditions illustrated in FIG. 12 are an example. The conditions can be used in combination to accurately determine whether a jam is caused by strong operation.

Figure 13:
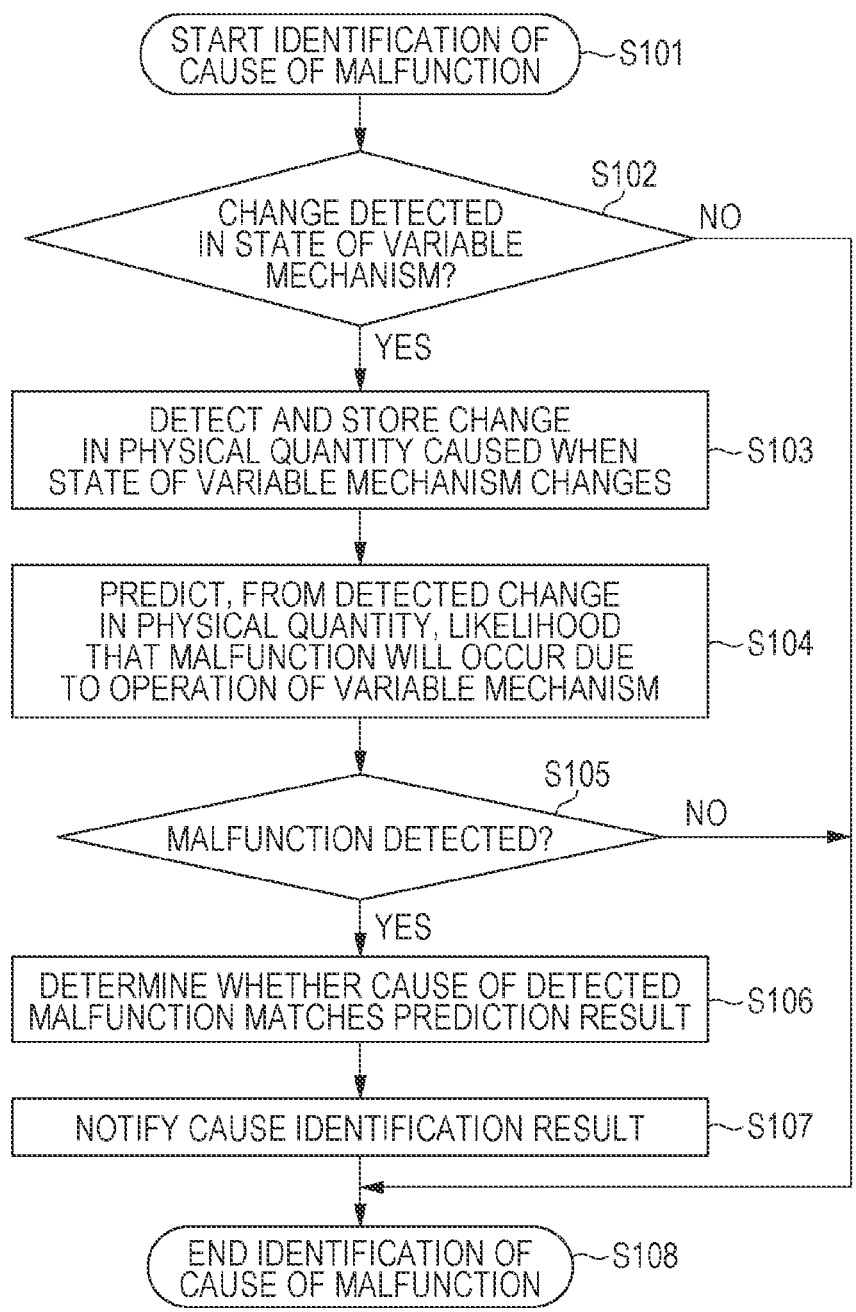
FIG. 13 is a flowchart illustrating a process for identifying the cause of a malfunction.

A method for identifying the cause of a malfunction (or abnormal condition) caused by strong operation of a variable mechanism according to an embodiment of the present disclosure will be described with reference to a flowchart illustrated in FIG. 13. The flowchart illustrated in FIG. 13 is implemented by the CPU 150 included in the controller 100 executing a program stored in a read-only memory (ROM) (not illustrated) or the like.

First, the identification of the cause of the malfunction is started (S101). Then, the CPU 150 determines whether a change in the state of the variable mechanism, such as the feed cassette 2, is detected (S102). If a change in the state is detected, the CPU 150 detects and stores a change in physical quantity caused when the state of the variable mechanism changes (S103). In the present embodiment, the insertion sound (sound pressure) of the feed cassette 2 is detected by the microphone to measure the insertion speed of the feed cassette 2. Alternatively, a speed detector for directly detecting the insertion speed of the feed cassette 2 may be disposed. Any other detector such as a vibration detector for detecting vibration at the time of insertion of the feed cassette 2 or a force detector for detecting an impact force may be disposed.

Further, the target variable mechanism is not limited to the feed cassette 2 and may be a unit removably attachable to the apparatus main body 10, such as an opening and closing cover, a fixing device, or a cartridge.

Then, the CPU 150 predicts, from the detected change in physical quantity, the likelihood that a malfunction will occur due to the operation of the variable mechanism (S104). After that, the CPU 150 determines whether a malfunction has actually occurred (S105). If a malfunction has occurred, the CPU 150 determines whether the malfunction is caused by the operation of the variable mechanism as predicted in S104, based on the conditions illustrated in FIG. 12 (S106). Even when not all of the conditions illustrated in FIG. 12 are satisfied, if some of the conditions are satisfied, the CPU 150 may determine that the malfunction is caused by the operation of the variable mechanism. If a malfunction is detected before strong operation of the variable mechanism is detected, the CPU 150 does not determine that the malfunction is caused by the strong operation. If a malfunction is detected after strong operation is detected, the CPU 150 may determine that the malfunction is caused by the strong operation.

Finally, the CPU 150 causes the display 165 to display the identified cause as a determination result or troubleshooting information based on the cause or transmits the determination result or the troubleshooting information to the external management server 170 via the communication interface 160 (S107). The management server 170 may transmit the received information to the monitoring tool 180 to display the transmitted information on the display 185 of the monitoring tool 180. As a result, the flowchart for identifying the cause of the malfunction ends (S108). If no change in the state of the variable mechanism is detected in S102 or if no malfunction is detected in S105, the flowchart for identifying the cause ends.

In the flowchart described above, the CPU 150 included in the controller 100 of the image forming apparatus 1 or the image forming apparatus 300 identifies the cause of a malfunction. However, some or all of these processes may be performed by the CPU 175 of the management server 170. For example, the CPU 150 may transmit the data obtained from the sound collector 70 and information (e.g., a detection result) such as the occurrence location of a malfunction to the management server 170, and the CPU 175 may perform a process of analyzing sound wave level data in detail and/or identifying the cause of the malfunction. As a result, the functions of the controller 100 of the image forming apparatus 1 or the image forming apparatus 300 can be simplified. In addition, since the storage capacity of the buffer 120 can be reduced, the cost of the controller 100 can also be reduced.

Identification of the Cause of a Malfunction other than a Jam

Strong operation of the cassette may cause a malfunction other than a jam. For example, when the feed cassette 2 is strongly operated, the side regulating plates 2c and 2d may be damaged, and the position of the recording media P in the feed cassette 2 may be shifted to one side in the paper width direction. If the image forming operation is performed in this state, the recording media P whose position is shifted to the side in the paper width direction do not pass through a portion of a heater in the fixing device 21 when continuously passing through the fixing device 21. At this time, the portion of the heater through which the recording media P do not pass is overheated, and the temperature of an end portion of the fixing device 21 rises. This may lead to a failure of the image forming apparatus 1. Accordingly, the image forming apparatus 1 may notify the user of a fixing end portion temperature rise error and stop the image forming operation. Also in this case, if the tendency of an end portion temperature rise resulting from strong operation is detected, it can be determined that the fixing end portion temperature rise error is caused by the strong operation. For example, the image forming apparatus 1 may prompt the user to check the feed cassette 2. This makes it possible to avoid an error or a failure of the image forming apparatus 1.

In addition to the end portion temperature rise error of the fixing device 21, damage of the side regulating plates 2c and 2d may cause continuous skewing of the recording media P. If a skew occurs, poor image quality may occur due to reasons other than a jam or a fixing end portion temperature rise error, such that the image is biased to one side of the recording medium P.

Also in this case, whether the cause of the skew is due to strong operation can be determined in combination with a sensor for detecting a skew. As described above, if the side regulating plate 2c or 2d is damaged, a continuous malfunction is detected. Accordingly, the predetermined number of printed sheets 173 described with reference to FIG. 8 may be set to be larger than that in the case of a jam, or the tendency (such as continuous skewing tendency, for example) up to the predetermined number of printed sheets may be detected to determine whether the malfunction is caused by the strong operation.

As described above, according to the present embodiment, the cause of an abnormal condition of the image forming apparatus can be identified based on a sound produced by a user's operation.

Second Embodiment

A method for identifying the cause of a malfunction according to a second embodiment will be described. Since the basic configuration according to the second embodiment is similar to that according to the first embodiment described with reference to FIG. 1, the description of similar portions to those of the first embodiment will be omitted, and only different portions will be described.

In the first embodiment, the sound wave produced when the cassette is inserted is detected to determine whether strong operation is performed. In the present embodiment, strong operation is detected by using a method different from that of the first embodiment. Further, the variable mechanism will be described using the cartridge 26, rather than the cassette in the first embodiment, as a unit removably attachable to the apparatus main body 10.

Overview of the Configuration According to the Second Embodiment

Figure 14A:
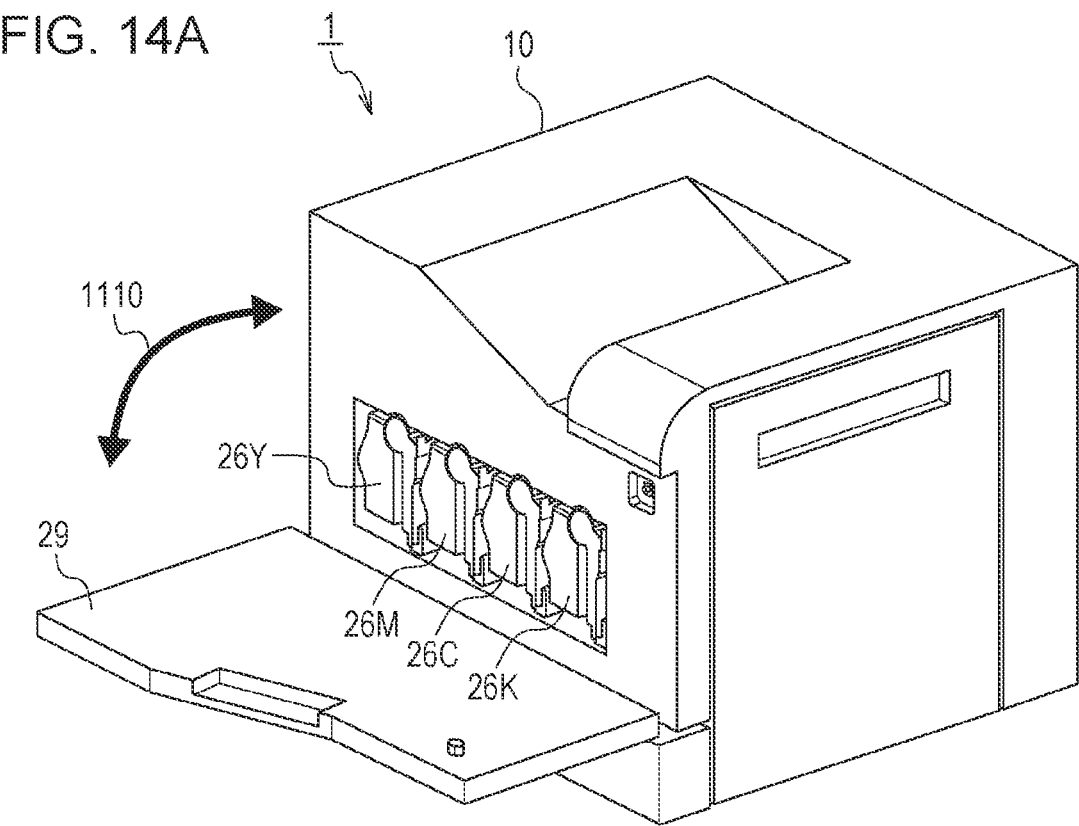
FIGS. 14A and 14B are perspective views of an image forming apparatus according to a second embodiment, illustrating how a cartridge is inserted into and removed from the image forming apparatus.
Figure 14B:
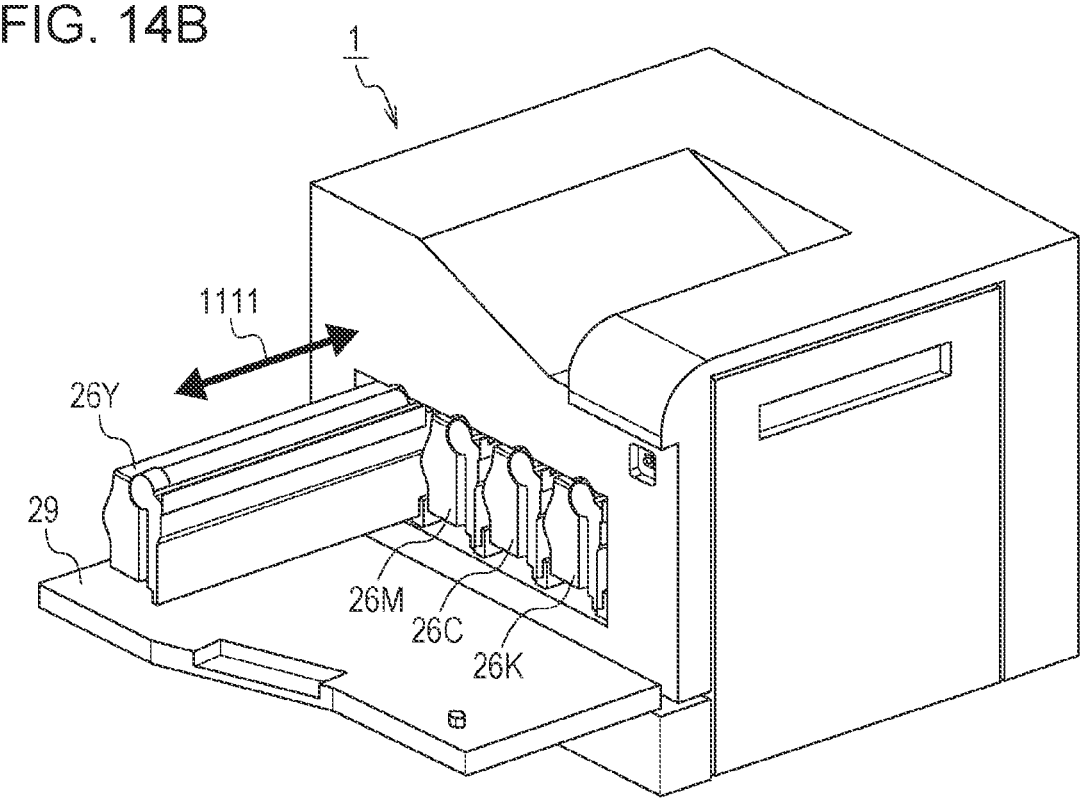

FIG. 14A is a perspective view of the image forming apparatus 1 when a front cover 29 of the image forming apparatus 1 is opened. As illustrated in FIG. 14A, the front cover 29 can be opened and closed in a direction indicated by an arrow 1110. When the front cover 29 is opened, the cartridge 26 (e.g., a unit of the image forming apparatus 1) is exposed to the outside to allow the user to remove it or insert a new cartridge. FIG. 14B illustrates a state in which the yellow cartridge 26Y is pulled out. The cartridge 26 is insertable and removable in a direction indicated by an arrow 1111.

FIGS. 15A to 15D are schematic views of the cartridge 26 that is to be inserted into the apparatus main body 10. The components of the image forming apparatus 1 are not illustrated, except for those necessary for description. As illustrated in FIGS. 15A to 15D, the cartridge 26 includes a notch 27 and a driven coupling portion 28. The image forming apparatus 1 includes a motor 60, a pinion gear 61, a drive gear 62, and detection sensors 71 and 72. The drive gear 62 is integrally formed with a drive coupling portion 62a. The pinion gear 61 and the drive gear 62 are formed of helical gears.

Figure 15A:
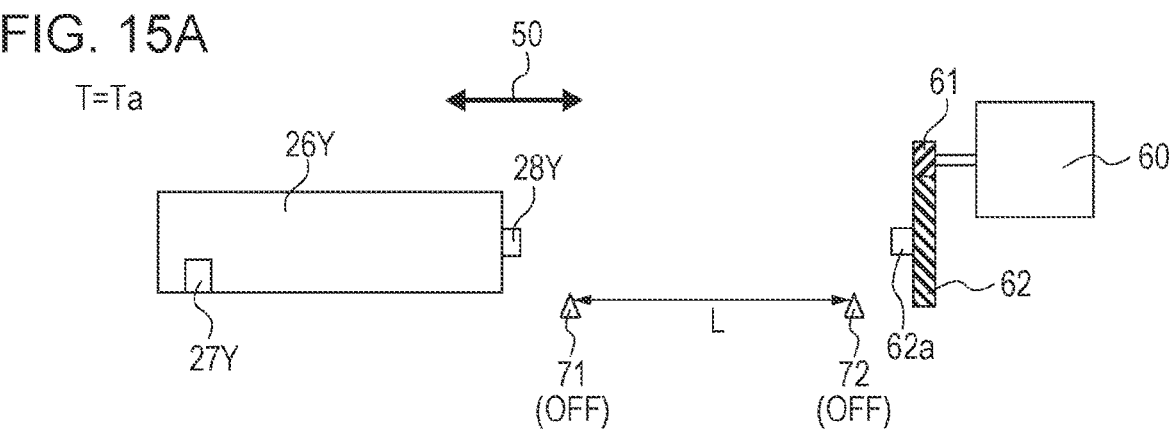
FIGS. 15A to 15D are side views of the image forming apparatus according to the second embodiment, illustrating how the cartridge is inserted into and removed from the image forming apparatus.
Figure 15B:
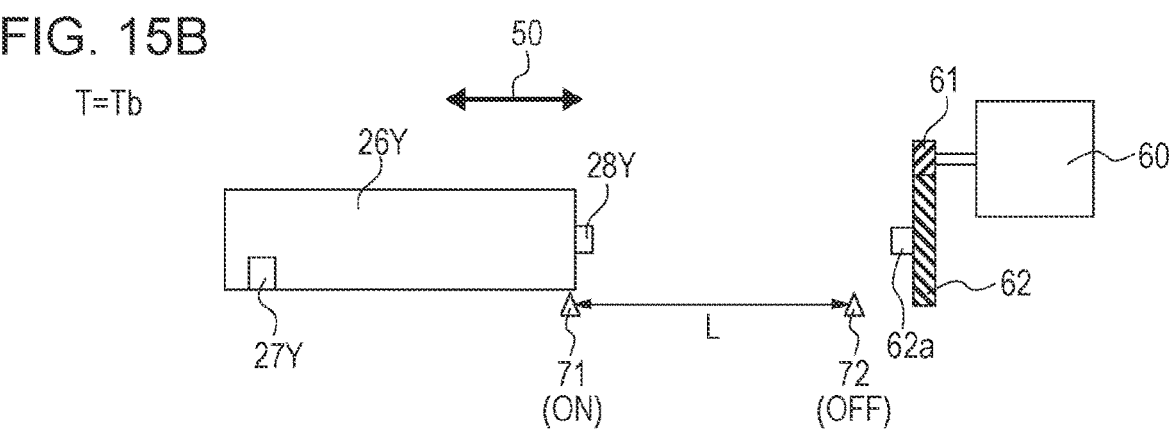
Figure 15C:
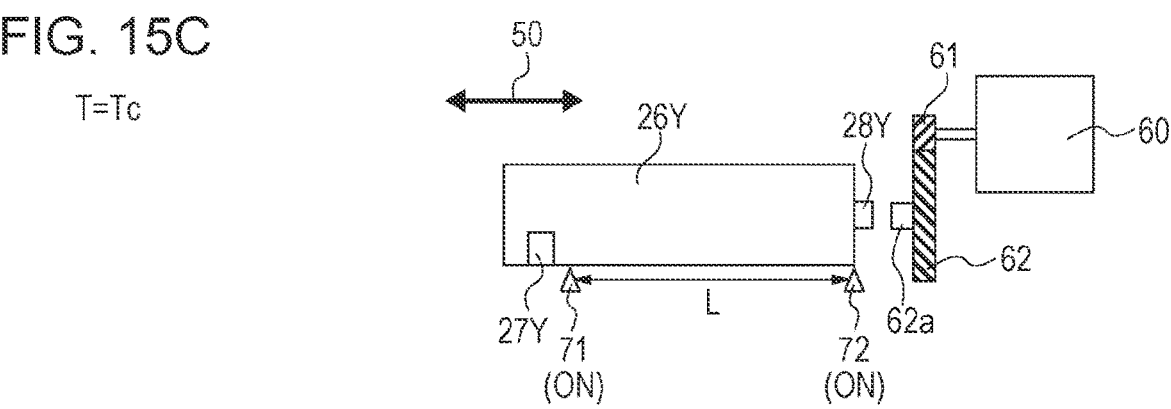
Figure 15D:
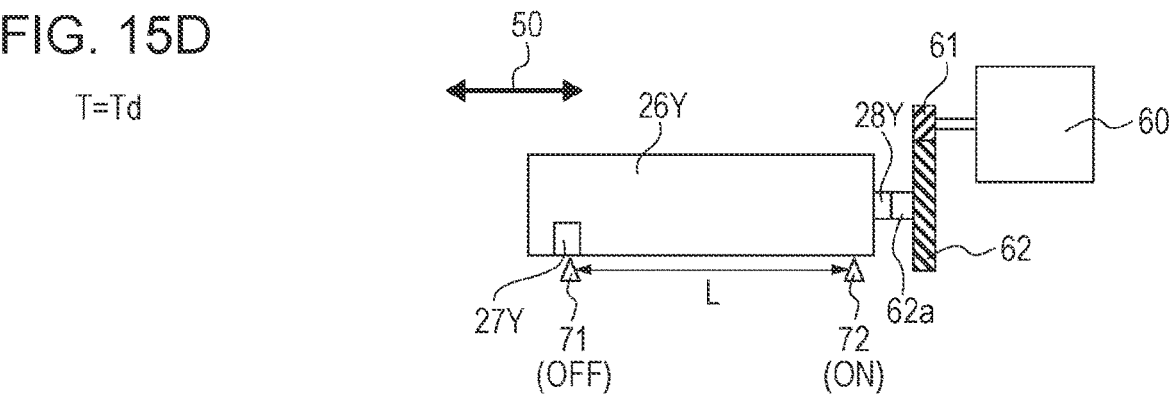

FIG. 15A illustrates a state in which the cartridge 26 is pulled out from the apparatus main body 10 of the image forming apparatus 1, and corresponds to the state illustrated in FIG. 14B. FIGS. 15B and 15C illustrate a state in which the cartridge 26 is being inserted into the apparatus main body 10. FIG. 15D illustrates a state in which the cartridge 26 is completely inserted into the apparatus main body 10, and corresponds to the state illustrated in FIG. 14A. When the cartridge 26 is completely inserted into the apparatus main body 10, the drive coupling portion 62a and the driven coupling portion 28Y are coupled to each other, and the driving force of the motor 60 is transmitted to the driven coupling portion 28Y in response to the start of the image forming operation. When the driven coupling portion 28Y is driven, the photosensitive member 11, the charging roller 12, and the developing roller 15 in the cartridge 26 are driven, and image formation is performed.

Method for Detecting Strong Operation According to the Second Embodiment

A mechanism for detecting the speed at which the cartridge 26 is inserted into the apparatus main body 10 of the image forming apparatus 1 will be described with reference to FIGS. 15A to 15D and 16. First, a configuration for detecting the speed at which the cartridge 26 is inserted into the image forming apparatus 1 will be described with reference to FIGS. 15A to 15D. As described above, the image forming apparatus 1 includes the detection sensors 71 and 72. The detection sensors 71 and 72 may be reflection optical sensors, contact switches, or the like. In the following description, the detection sensors 71 and 72 are each a reflection optical sensor. The reflection optical sensor outputs a voltage indicating ON when a reflection surface of an object is located in close proximity to the reflection optical sensor, and outputs a voltage indicating OFF when a reflection surface of an object is not located in close proximity to the reflection optical sensor. That is, the detection sensors 71 and 72 are sensors for detecting whether the cartridge 26 is installed in the apparatus main body 10, and the two sensors detect the cartridge 26 at different positions.

In FIG. 15A, the reflection surface of the cartridge 26 is not located in close proximity to the detection sensor 71 or 72. Thus, the detection results of both the detection sensors 71 and 72 are OFF. In FIG. 15B, the cartridge 26 is in close proximity to the detection sensor 71. Thus, the detection result of only the detection sensor 71 is ON. In FIG. 15C, the cartridge 26 is in close proximity to the detection sensor 72 while the detection result of the detection sensor 71 is ON. Thus, the detection result of the detection sensor 72 is also ON. In FIG. 15D, the detection sensor 71 is in close proximity to the notch 27. Thus, the detection result of the detection sensor 71 is OFF again. Since the detection result of the detection sensor 71 is OFF and the detection result of the detection sensor 72 is ON, the cartridge 26 is completely inserted into the image forming apparatus 1.

Figure 16:
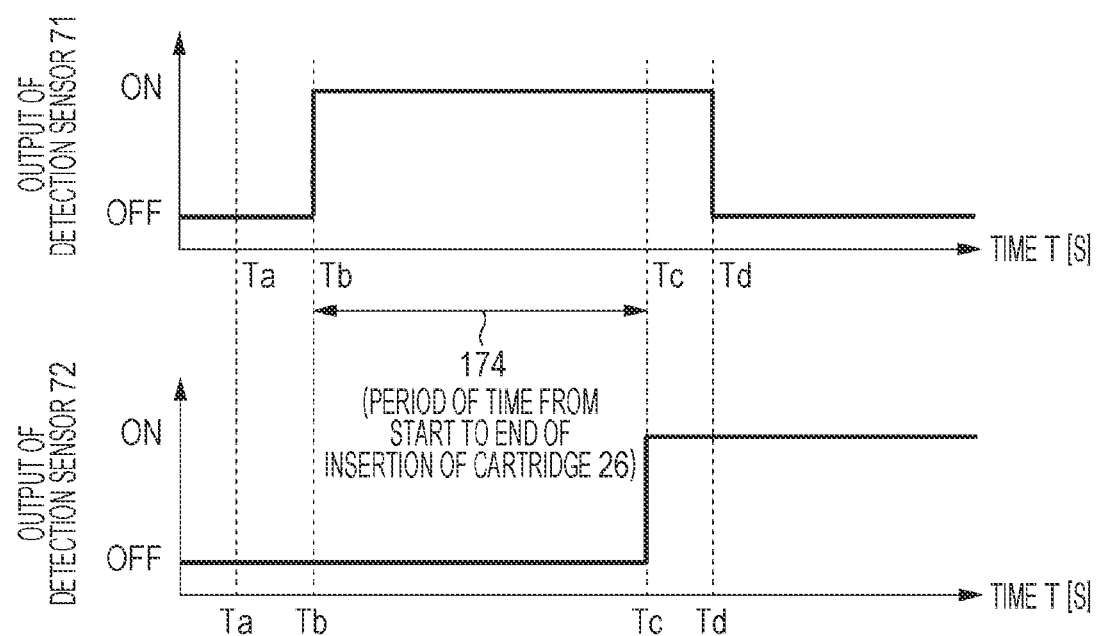
FIG. 16 depicts graphs illustrating outputs of detection sensors during insertion and removal of the cartridge according to the second embodiment.

FIG. 16 depicts graphs illustrating ON/OFF of the detection results of the detection sensors 71 and 72 in FIGS. 15A to 15D. In FIG. 16, at time Ta (corresponding to FIG. 15A), the detection results of both of the detection sensors 71 and 72 are OFF. At time Tb (corresponding to FIG. 15B) when the cartridge 26 is in close proximity to the detection sensor 71, the detection result of the detection sensor 71 is ON. At the time when the cartridge 26 is in close proximity to the detection sensor 72 (corresponding to FIG. 15C), the detection result of the detection sensor 72 is ON. The time interval over which the cartridge 26 moves from the detection sensor 71 to the detection sensor 72, that is, a period of time 174 from the time Tb to the time Tc, is detected to calculate the moving speed of the cartridge 26. Specifically, a moving speed V of the cartridge 26 is calculated in accordance with $V=L/(Tc-Tb)$, where L is the distance between the detection sensors 71 and 72. When the moving speed V becomes greater than or equal to a predetermined threshold, it is determined that the cartridge 26 has been strongly inserted by the user, that is, strong operation has occurred. The threshold for determining the occurrence of strong operation is set as a value up to which the quality of the image forming apparatus 1 is guaranteed. If strong operation has occurred, it is determined that the cartridge 26 has been inserted into the image forming apparatus 1 with a force greater than or equal to the force up to which the quality of the image forming apparatus 1 is guaranteed.

Identification of a Cause of a Malfunction Due to Strong Operation According to the Second Embodiment In FIGS. 15A to 15D, if strong operation of the cartridge 26 occurs, for example, a strong impact may be applied to the driven coupling portion 28Y and the drive coupling portion 62a. At this time, a strong impact in an insertion and removal direction indicated by the black arrow 50 is applied to a portion where the pinion gear 61 and the drive gear 62 serving as helical gears mesh with each other. As a result, the pinion gear 61 and the drive gear 62 may be damaged. If the pinion gear 61 and the drive gear 62 are damaged, the drive load to be applied to the motor 60 becomes very large, which may make the motor 60 undrivable. At this time, the CPU 150 determines that a driving error of the motor 60 has occurred, and interrupts the image forming operation. As described above, a malfunction (or abnormal condition) due to strong operation may also occur in the cartridge 26.

More specifically, a sensor (not illustrated) for detecting the driving torque of the motor 60 and an encoder (not illustrated) for detecting the rotation state of the motor 60 are disposed. The CPU 150 monitors the sensor or encoder to detect the occurrence of an abnormality in the motor 60. If an abnormal condition of the motor 60 is detected immediately after the strong operation of the cartridge 26 is detected, the CPU 150 identifies the strong operation of the cartridge 26 as the cause of the abnormal condition.

As described above, also according to the second embodiment, the cause of an abnormal condition of an image forming apparatus can be identified based on a sound produced by a user's operation.

While the present embodiment adopts the method for determining strong operation on the basis of a difference between the detection timings of the detection sensors 71 and 72, as in the first embodiment, the strong operation may be determined on the basis of the magnitude of the sound pressure using the sound collector 70. Also in the present embodiment, as described in the first embodiment, the CPU 175 of the management server 170 may perform a process of identifying the cause of an abnormality.

Third Embodiment

A method for identifying the cause of a malfunction according to a third embodiment will be described. Since the basic configuration according to the third embodiment is similar to that according to the first embodiment described with reference to FIG. 1, the description of similar portions to those of the first and second embodiments will be omitted, and only different portions will be described.

In the present embodiment, the right cover 80 is used as an example of the variable mechanism, and a malfunction (or abnormal condition) that can occur due to the strong operation of the right cover 80 will be described.

Overview of the Configuration According to the Third Embodiment

The configuration of the right cover 80 according to the present embodiment will be described with reference to FIGS. 17A to 17D. FIGS. 17A to 17D illustrate states in sequence from a state in which the right cover 80 of the image forming apparatus 1 is opened (FIG. 17A) to a state in which the right cover 80 is fully closed (FIG. 17D). The components of the image forming apparatus 1 that are not necessary for the description of the present embodiment are not illustrated.

Figure 17A:
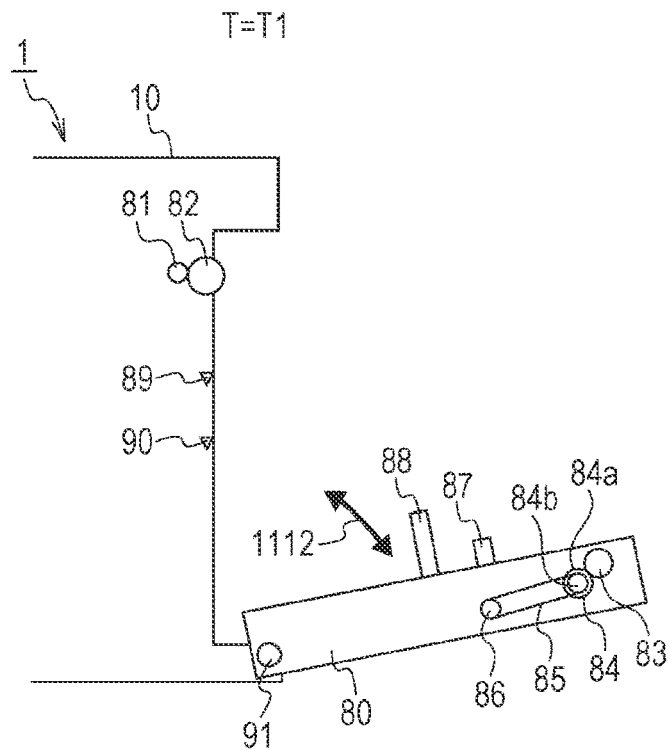
FIGS. 17A to 17D are side views of an image forming apparatus according to a third embodiment, illustrating how a right cover is opened and closed.

As illustrated in FIG. 17A, a duplex drive pinion gear 81 connected to a duplex motor (not illustrated) and a duplex drive gear 82 are rotatably supported on the apparatus main body 10 of the image forming apparatus 1, and the apparatus main body 10 of the image forming apparatus 1 is provided with right-cover sensors 89 and 90. The right-cover sensors 89 and 90 may be reflection optical sensors, contact switches, or the like and will be described here as reflection optical sensors.

The right cover 80 is attached to the apparatus main body 10 of the image forming apparatus 1 through a pivot 91, and is rotatable about the pivot 91 in a direction indicated by an arrow 1112.

A duplex driven gear 83, a pulley gear 84, a belt 85, and a pulley 86 are rotatably supported on the right cover 80, and the right cover 80 is provided with right-cover flags 87 and 88. The pulley gear 84 is configured such that a gear portion 84a and a pulley portion 84b are integrally formed on the same axis relative to the rotation axis. The gear portion 84a meshes (engages) with the duplex driven gear 83, and the pulley portion 84b can transmit the driving force to the pulley 86 through the belt 85. The pulley 86 is coupled to the duplex conveyance roller 42 (illustrated in FIG. 1). As the pulley 86 rotates, the duplex conveyance roller 42 rotates.

Figure 17B:
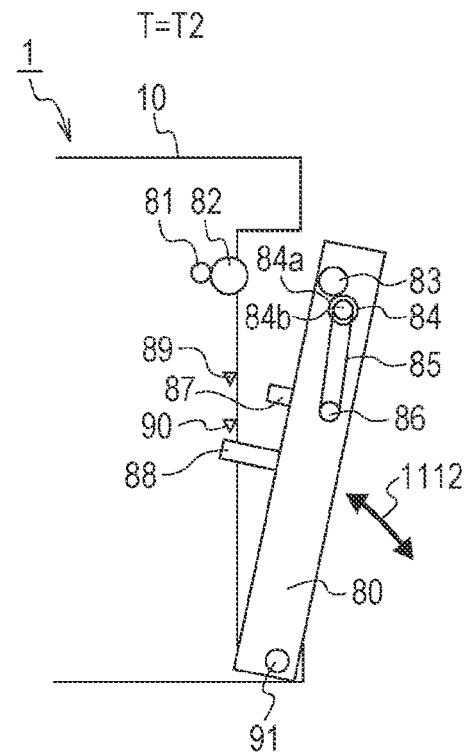
Figure 17C:
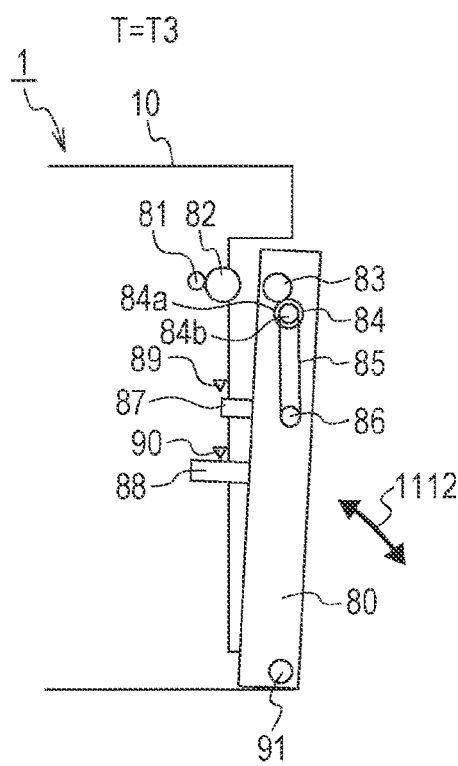
Figure 17D:
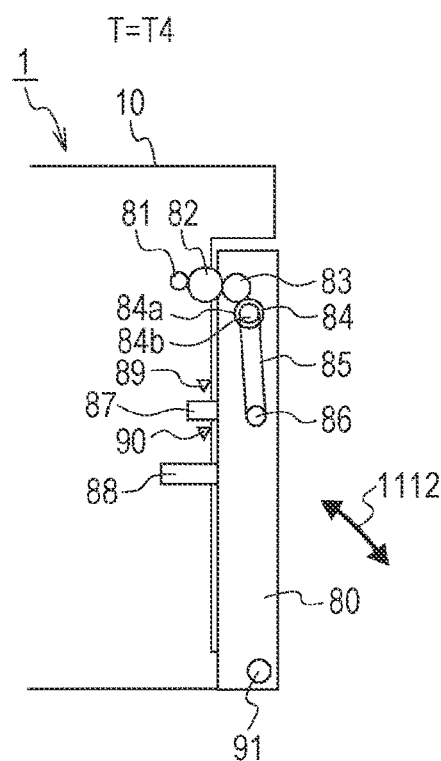

FIG. 17B illustrates a state in which the right-cover flag 88 is in close proximity to the right-cover sensor 90 during the closing of the right cover 80. At this time, the detection result of the right-cover sensor 90 is changed from OFF to ON. FIG. 17C illustrates a state in which the right-cover flag 87 is in close proximity to the right-cover sensor 89 when the right cover 80 is more closed than in FIG. 17B. At this time, the detection result of the right-cover sensor 89 is changed from OFF to ON. FIG. 17D illustrates a state in which the right cover 80 is fully closed. At this time, the duplex drive gear 82 and the duplex driven gear 83 are coupled to each other to allow the driving force of the duplex motor (not illustrated) to be transmitted to the pulley 86, making the duplex conveyance roller 42 (illustrated in FIG. 1) drivable.

Method for Detecting Strong Operation According to the Third Embodiment

A mechanism for detecting the speed at which the right cover 80 is closed will be described with reference to FIGS. 17A to 17D and 18.

Figure 18:
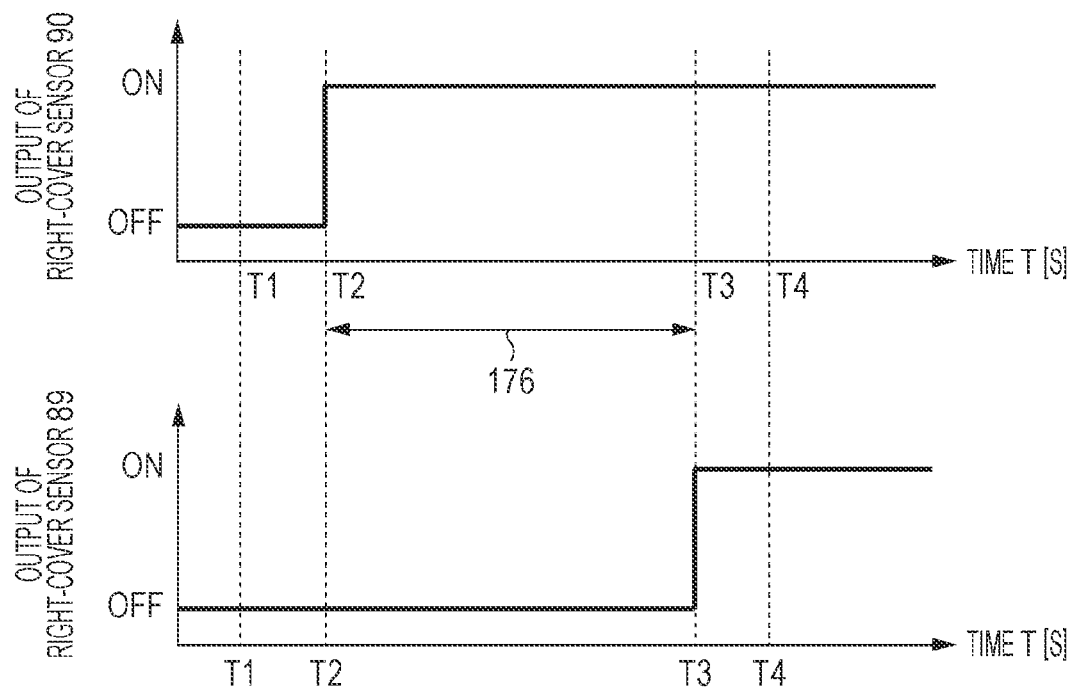
FIG. 18 depicts graphs illustrating outputs of detection sensors when the right cover is opened and closed according to the third embodiment.

FIG. 18 depicts graphs illustrating ON/OFF of the detection results of the right-cover sensors 89 and 90 in FIGS. 17A to 17D. In FIG. 18, at time T1 (corresponding to FIG. 17A), the detection results of both of the right-cover sensors 89 and 90 are OFF. At time T2 (corresponding to FIG. 17B) when the right-cover flag 88 is in close proximity to the right-cover sensor 90, the detection result of the right-cover sensor 90 is ON. At the time when the right-cover flag 87 is in close proximity to the right-cover sensor 89 (corresponding to FIG. 17C), the detection result of the right-cover sensor 89 is ON. The time interval from the time when the detection result of the right-cover sensor 90 is ON to the time when the detection result of the right-cover sensor 89 is ON, that is, a period of time 176 from the time T2 from the time T3, is detected to calculate the closing speed of the right cover 80. When the closing speed becomes greater than or equal to a predetermined value, it is determined that the right cover 80 has been strongly closed by the user, that is, strong operation has occurred.

Identification of a Cause of a Malfunction Due to Strong Operation According to the Third Embodiment In FIGS. 17A to 17D, if strong operation of the right cover 80 occurs, for example, a strong impact may be applied to the duplex drive gear 82 and the duplex driven gear 83 (driven gear). This impact may damage the duplex drive gear 82 and the duplex driven gear 83. For example, if some of the teeth of the duplex drive gear 82 or the duplex driven gear 83 are damaged, rotational fluctuations occur when the damaged teeth mesh with each other, and the driving force is not correctly transmitted to the duplex conveyance roller 42. As a result, the recording medium P is conveyed incorrectly, resulting in a duplex conveyance error. If a supporting portion of the duplex drive gear 82 or the duplex driven gear 83 is damaged due to the strong operation, the gear with the damaged supporting portion is inclined, and a meshing failure may occur. As a result, the drive load to be applied to the duplex motor (not illustrated) becomes very large, which makes the duplex motor undrivable. At this time, the image forming apparatus 1 determines that a driving error of the duplex motor has occurred, and interrupts the image forming operation. As described above, a malfunction due to strong operation may also occur in the right cover 80.

As described above, also according to the third embodiment, the cause of an abnormal condition of an image forming apparatus can be identified based on a sound produced by a user's operation.

While the present embodiment adopts the method for determining strong operation on the basis of a difference between the detection timings of the right-cover sensors 89 and 90, as in the first embodiment, the strong operation may be determined on the basis of the magnitude of the sound pressure using the sound collector 70. Also in the present embodiment, as described in the first embodiment, the CPU 175 of the management server 170 may perform a process of identifying the cause of an abnormality.

In the embodiments described above, the image forming apparatus 1 (or the image forming apparatus 300) is connected to the management server 170 and the monitoring tool 180 to form the image forming system 200. With this configuration, the cause of an abnormal condition is notified to a service engineer to make it easy for the service engineer to perform maintenance and inspection. Instead of the service engineer, the user themselves may perform the maintenance and inspection of the image forming apparatus 1. Thus, the image forming apparatus 1 does not need to be included in the image forming system 200, and may be used alone. In other words, the CPU 150 of the image forming apparatus 1 may be configured to, upon identifying the cause of an abnormal condition, cause the display 165 to display information on the cause of the abnormal condition to notify the user of the cause.

In the embodiments described above, furthermore, the image forming apparatus 1 (or the image forming apparatus 300) is, but not limited to, an electrophotographic image forming apparatus. Some embodiments of the present disclosure may provide image forming apparatuses having different printing methods, such as an inkjet method and an offset printing method.

According to some embodiments of the present disclosure, the cause of an abnormal condition of an image forming apparatus can be identified based on a sound produced by a user's operation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-189868, filed Nov. 29, 2022, which is hereby incorporated by reference herein in its entirety.

What is claimed is:

1. An image forming system comprising:
   an image forming apparatus configured to form an image on a recording medium; and
   a management apparatus configured to manage the image forming apparatus,
   wherein the image forming apparatus includes:
      a variable mechanism configured to change from a first state to a second state or from the second state to the first state in response to being physically operated by a user;
      a physical quantity detection unit configured to detect a change in physical quantity caused when a state of the variable mechanism changes;
      an abnormality detection unit configured to detect an occurrence of an abnormal condition of the image forming apparatus; and
      a transmission unit configured to transmit a detection result of the physical quantity detection unit and a detection result of the abnormality detection unit to the management apparatus,
   wherein the management apparatus includes:
      a determination unit configured to determine whether the abnormal condition is caused by a change in the state of the variable mechanism, based on the detection results transmitted from the transmission unit; and
      a notification unit configured to provide a notification that the abnormal condition is caused by a change in the state of the variable mechanism in accordance with a determination result of the determination unit,
   wherein the determination unit is configured to determine that the abnormal condition is caused by a change in the state of the variable mechanism when the abnormal condition is detected by the abnormality detection unit after the change in physical quantity detected by the physical quantity detection unit exceeds a threshold,
   wherein the determination unit is configured to determine that the abnormal condition is caused by a change in the state of the variable mechanism when a difference between the number of sheets printed up to a first time point at which the change in physical quantity exceeds the threshold and the number of sheets printed up to a second time point at which the abnormal condition is detected by the abnormality detection unit is less than or equal to a predetermined number of printed sheets, and p1 wherein the determination unit is configured not to determine that the abnormal condition is caused by a change in the state of the variable mechanism when the difference is larger than the predetermined number of printed sheets.

2. The image forming system according to claim 1, wherein the physical quantity detection unit includes at least one of a sound collector configured to detect a sound pressure generated in response to a change in the state of the variable mechanism, a speed detector configured to detect a speed of the variable mechanism when the state of the variable mechanism changes, a vibration detector configured to detect vibration generated in response to a change in the state of the variable mechanism, and a force detector configured to detect an impact force generated in response to a change in the state of the variable mechanism.

3. The image forming system according to claim 1, wherein the determination unit is configured to determine that the abnormal condition is caused by a change in the state of the variable mechanism when a position of the variable mechanism for which the change in physical quantity exceeds the threshold and a position where the abnormal condition has occurred have a relationship with each other, and
wherein the determination unit is configured not to determine that the abnormal condition is caused by a change in the state of the variable mechanism when the position of the variable mechanism and the position where the abnormal condition has occurred have no relationship with each other.

4. The image forming system according to claim 1, wherein the variable mechanism comprises a cassette removably attachable to an apparatus main body of the image forming apparatus and configured to be loaded with recording media to be used for image formation.

5. The image forming system according to claim 4, wherein the image forming apparatus further includes a loaded-amount detection unit configured to detect a loaded amount of recording media loaded in the cassette,
wherein the determination unit is configured to determine that the abnormal condition is caused by a change in the state of the variable mechanism when the loaded amount detected by the loaded-amount detection unit is larger than a first threshold,
wherein the determination unit is configured not to determine that the abnormal condition is caused by a change in the state of the variable mechanism when the loaded amount is less than or equal to the first threshold and is larger than a second threshold smaller than the first threshold, and
wherein the determination unit is configured to determine that the abnormal condition is caused by a change in the state of the variable mechanism when the loaded amount is less than or equal to the second threshold.

6. The image forming system according to claim 1, wherein the variable mechanism comprises a cartridge removably attachable to an apparatus main body of the image forming apparatus, the cartridge including a coupling portion engageable with a drive gear disposed in the apparatus main body and being rotatable to form the image on the recording medium.

7. The image forming system according to claim 1, wherein the variable mechanism comprises a cover openable and closable with respect to an apparatus main body of the image forming apparatus, and
wherein the cover includes:
a driven gear engageable with a drive gear disposed in the apparatus main body; and
a conveyance unit configured to convey the recording medium, the conveyance unit being rotatable by a driving force transmitted through the driven gear.

8. An image forming system comprising:
an image forming apparatus configured to form an image on a recording medium; and
a management apparatus configured to manage the image forming apparatus,
wherein the image forming apparatus includes:
a variable mechanism configured to change from a first state to a second state or from the second state to the first state in response to being physically operated by a user;
a first state detection unit configured to detect a change in a state of the variable mechanism;
a second state detection unit configured to detect a change in the state of the variable mechanism at a position different from a position of the first state detection unit;
an abnormality detection unit configured to detect an occurrence of an abnormal condition of the image forming apparatus; and
a transmission unit configured to transmit a detection result of the first state detection unit, a detection result of the second state detection unit, and a detection result of the abnormality detection unit to the management apparatus,
wherein the management apparatus includes:
a determination unit configured to determine whether the abnormal condition is caused by a change in the state of the variable mechanism, based on the detection results transmitted from the transmission unit; and
a notification unit configured to provide a notification that the abnormal condition is caused by a change in the state of the variable mechanism in accordance with a determination result of the determination unit,
wherein the determination unit is configured to determine that the abnormal condition is caused by a change in the state of the variable mechanism when a time interval from detection of the change in the state by the first state detection unit to detection of the change in the state by the second state detection unit is shorter than a threshold time and thereafter the abnormal condition is detected by the abnormality detection unit,
wherein the determination unit is configured to determine that the abnormal condition is caused by a change in the state of the variable mechanism when a difference between the number of sheets printed up to a first time point at which the time interval shorter than the threshold time is detected and the number of sheets printed up to a second time point at which the abnormal condition is detected by the abnormality detection unit is less than or equal to a predetermined number of printed sheets, and
wherein the determination unit is configured not to determine that the abnormal condition is caused by a change in the state of the variable mechanism when the difference is larger than the predetermined number of printed sheets.

9. The image forming according to claim 8,
wherein the determination unit is configured to determine that the abnormal condition is caused by a change in the state of the variable mechanism when a position of the variable mechanism for which the time interval shorter than the threshold time is detected and a position where the abnormal condition has occurred have a relationship with each other, and
wherein the determination unit is configured not to determine that the abnormal condition is caused by a change in the state of the variable mechanism when the position of the variable mechanism and the position where the abnormal condition has occurred have no relationship with each other.

10. An image forming system comprising:
a server; and
an image forming apparatus configured to form an image on a recording medium, the image forming apparatus including:
a main body;
a unit configurable in a first state in which the unit is pulled out from the main body and a second state in which the unit is attached to the main body;
a physical quantity detection unit configured to detect a physical quantity changing while the unit changes from the first state to the second state;
an abnormality detection unit configured to detect an occurrence of an abnormal condition of the image forming apparatus; and
a transmission unit configured to obtain (i) data from the physical quantity detection unit and (ii) a detection result of the abnormality detection unit and transmit the data and the detection result to the server,
wherein the server is configured to communicate with the image forming apparatus, the server including:
a determination unit configured to determine whether the abnormal condition is detected by the abnormality detection unit after the data exceeds a threshold, based on the data and the detection result; and
a notification unit configured to notify a display device so that the display device displays an information related to the abnormal condition and an abnormal operation of the unit when the determination unit determines that the abnormal condition is detected by the abnormality detection unit after the data exceeds the threshold,
wherein the data is related to the physical quantity detected when the unit changes from the first state to the second state,
wherein the determination unit is configured to determine whether a difference between the number of sheets printed up to a first time point at which the data exceeds the threshold and the number of sheets printed up to a second time point at which the abnormal condition is detected by the abnormality detection unit is less than or equal to a predetermined number of printed sheets, and
wherein the notification unit is configured to notify the display device so that the display device displays the information when the determination unit determines that a difference between the number of sheets printed up to a first time point at which the data exceeds the threshold and the number of sheets printed up to a second time point at which the abnormal condition is detected by the abnormality detection unit is less than or equal to a predetermined number of printed sheets.

11. The image forming system according to claim 10,
wherein the determination unit is configured to determine whether a position of the unit for which the data exceeds the threshold and a position where the abnormal condition has occurred have a relationship with each other, and
wherein the notification unit is configured to notify the display device so that the display device displays the information when the determination unit determines that a position of the unit for which the data exceeds the threshold and a position where the abnormal condition has occurred have a relationship with each other.

12. The image forming system according to claim 10, wherein the information includes at least one of a determination result of the determination unit and troubleshooting information.

13. A server for communicating with an image forming apparatus configured to form an image on a recording medium, wherein the image forming apparatus includes:
a main body;
a unit configurable in a first state in which the unit is pulled out from the main body and a second state in which the unit is attached to the main body;
a physical quantity detection unit configured to detect a physical quantity changing while the unit changes from the first state to the second state;
an abnormality detection unit configured to detect an occurrence of an abnormal condition of the image forming apparatus; and
a transmission unit configured to obtain (i) data from the physical quantity detection unit and (ii) a detection result of the abnormality detection unit and transmit the data and the detection result to the server,
wherein the server comprises:
a determination unit configured to determine whether the abnormal condition is detected by the abnormality detection unit after the data exceeds a threshold, based on the data and the detection result; and
a notification unit configured to notify a display device so that the display device displays an information related to the abnormal condition and an abnormal operation of the unit when the determination unit determines that the abnormal condition is detected by the abnormality detection unit after the data exceeds the threshold,
wherein the data is related to the physical quantity detected when the unit changes from the first state to the second state,
wherein the determination unit is configured to determine whether a difference between the number of sheets printed up to a first time point at which the data exceeds the threshold and the number of sheets printed up to a second time point at which the abnormal condition is detected by the abnormality detection unit is less than or equal to a predetermined number of printed sheets, and
wherein the notification unit is configured to notify the display device so that the display device displays the information when the determination unit determines that a difference between the number of sheets printed up to a first time point at which the data exceeds the threshold and the number of sheets printed up to a second time point at which the abnormal condition is detected by the abnormality detection unit is less than or equal to a predetermined number of printed sheets.

14. The server according to claim 13,
wherein the determination unit is configured to determine whether a position of the unit for which the data exceeds the threshold and a position where the abnormal condition has occurred have a relationship with each other, and
wherein the notification unit is configured to notify the display device so that the display device displays the information when the determination unit determines that a position of the unit for which the data exceeds the threshold and a position where the abnormal condition has occurred have a relationship with each other.

* * * * *